United States Patent [19]

Konishi et al.

[11] Patent Number: 5,469,309

[45] Date of Patent: Nov. 21, 1995

[54] MAGNETIC RECORDING/REPRODUCING APPARATUS WITH STOPPERS FOR LOADING BOATS

[75] Inventors: Akio Konishi; Yoshitomo Sakai, both of Hirakata; Yoshiyuki Saito, Kadoma; Hideaki Yoshio, Moriguchi, all of Japan

[73] Assignee: Matsushita Electric Industrial Co., Ltd., Osaka, Japan

[21] Appl. No.: 294,019

[22] Filed: Aug. 23, 1994

Related U.S. Application Data

[62] Division of Ser. No. 867,468, Apr. 13, 1992, Pat. No. 5,369,536.

[30] Foreign Application Priority Data

| Apr. 17, 1991 | [JP] | Japan | 3-085057 |
| Apr. 17, 1991 | [JP] | Japan | 3-085058 |
| Apr. 17, 1991 | [JP] | Japan | 3-085066 |

[51] Int. Cl.$^6$ .................................................. G11B 15/665
[52] U.S. Cl. .................................................. 360/85
[58] Field of Search ..................................... 360/85, 86, 95

[56] References Cited

U.S. PATENT DOCUMENTS

| 4,562,496 | 12/1985 | Saito et al. | 360/85 |
| 4,658,310 | 4/1987 | Kimura | 360/85 |
| 4,692,823 | 9/1987 | Gwon . | |
| 4,695,906 | 9/1987 | Kim | 360/85 |
| 4,975,793 | 12/1990 | Oka | 360/85 |
| 5,041,928 | 8/1991 | Sasaki et al. | 360/85 |

FOREIGN PATENT DOCUMENTS

| 0074148 | 3/1983 | European Pat. Off. . |
| 0087952A3 | 9/1983 | European Pat. Off. . |
| 0356213 | 2/1990 | European Pat. Off. . |
| 2719746 | 11/1977 | Germany . |
| 3700889A1 | 7/1987 | Germany . |
| 3727230A1 | 2/1988 | Germany . |
| 57-23334 | 5/1982 | Japan . |
| 57-86162 | 5/1982 | Japan . |
| 2149958 | 6/1985 | United Kingdom . |
| 2168836 | 6/1986 | United Kingdom . |
| 2169125 | 7/1986 | United Kingdom . |

OTHER PUBLICATIONS

Patent Abstract of Japan, vol. 8, No. 86 (P-269)(1523) 19 Apr. 1984 & JP-A-592254 (Matsushita) 7 Jan. 1984.

*Primary Examiner*—Stuart S. Levy
*Assistant Examiner*—George J. Letscher
*Attorney, Agent, or Firm*—Stevens, Davis, Miller & Mosher

[57] ABSTRACT

A loading mechanism for a magnetic recording/playback apparatus provides a positioning mechanism which can reliably and fixedly position a loading boat with a quite simple structure when completing an operation of withdrawing a magnetic tape. The invention also provides a loading post driving and pressing device which can eliminate the need of using a two-staged gear fitted with a spring, position two loading posts under pressing by one urging device, and realize reduction of the size, weight and thickness. The invention further provides a loading post driving device in which a gear serving as a prime mover part has the two-stages structure to realize reduction of the size, weight and height, and driving force can be directly transmitted from the gear serving as a prime mover part to a large loading gear by using no geneva gear.

4 Claims, 22 Drawing Sheets

FIG. 8
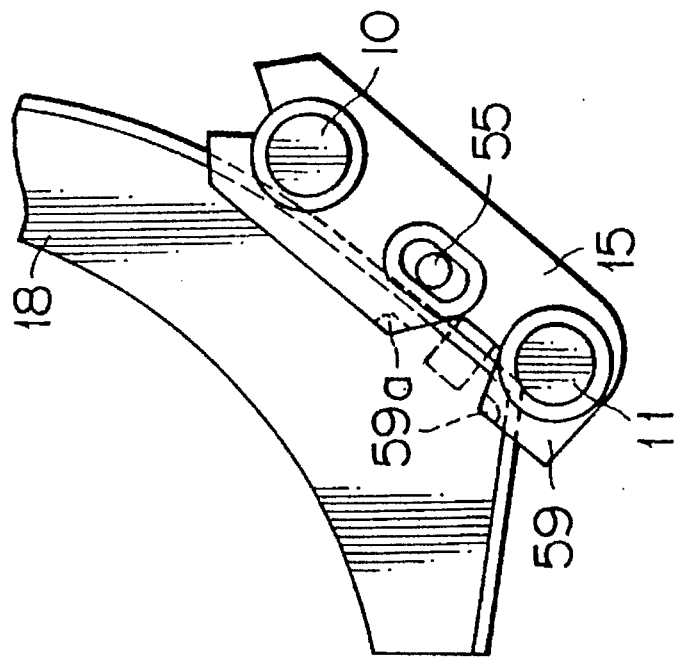
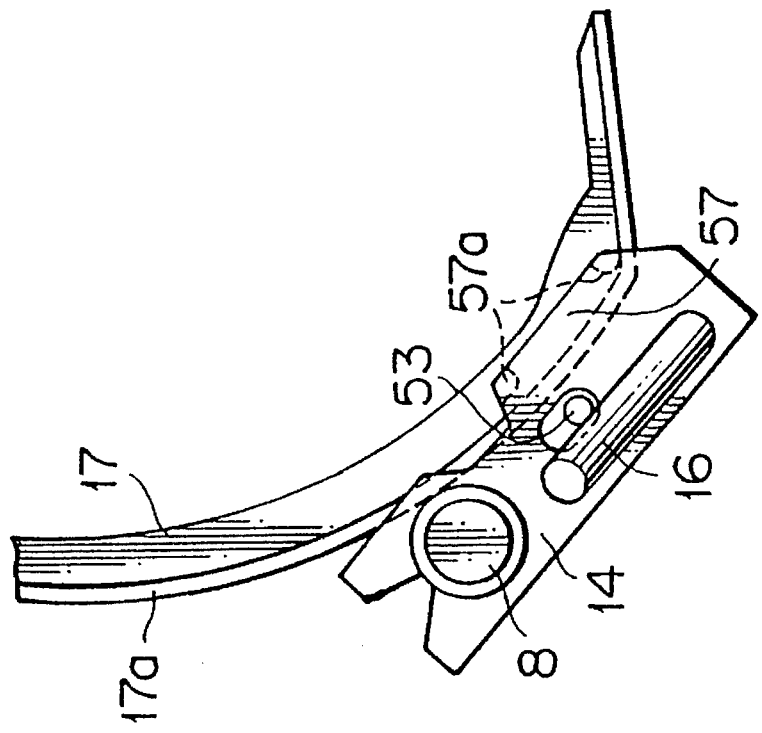

MAGNETIC RECORDING/REPRODUCING APPARATUS WITH STOPPERS FOR LOADING BOATS

This is a division of Ser. No. 867,468, filed Apr. 13, 1992, now U.S. Pat. No. 5,369,536, issued Nov. 29, 1994.

BACKGROUND OF THE INVENTION

1. Industrial Field of the Invention

The present invention relates to a rotary head type magnetic recording/playback apparatus (hereinafter referred to simply as a VTR) (VTR: Video Tape Recorder) in which a magnetic tape is wound around a cylindrical rotary head cylinder, having a rotary head built therein, over a predetermined angle to record/playback a signal by the rotary head, and more particularly, to a VTR in which a magnetic tape is automatically withdrawn out of a tape cassette having a supply reel and a take-up reel provided therein, and wound around the rotary head cylinder over a predetermined angle.

2. Description of the Prior Art

Recently, various kinds of trials have been made for reducing the size, weight and height of VTR. In particular, because a mechanism of loading a magnetic tape in VTR has a very complicated arrangement, needs a large number of parts, and affects the size of the entire VTR to a considerable degree, development of the loading mechanism is quite important.

A conventional arrangement of VTR, particularly, an arrangement for positioning a pair of magnetic tape withdrawer units during completing a tape loading operation, will be described below with reference to drawings (see JP-B-57-23334).

FIG. 19 is a top plan view showing an arrangement of VTR after completion of a tape loading operation. In FIG. 19, 101 denotes a cassettes having a supply reel and a take-up reel provided therein. A magnetic tape is wound around the both reels and extends, via guide posts 105a, 105b and 106, between the both reels.

The cassette 101 is rested on a base plate 110 at a predetermined position, the supply reel in the cassette 101 is fitted over a supply reel stand 111, and further the take-up reel is fitted over a take-up reel stand 112. 162 denotes an eraser head, 163 a control head, 164 a motor for a capstan and so forth, 165 a capstan and 166 an idler. I and II are a pair of magnetic tape withdrawer units for withdrawing the magnetic tape out of the cassette 101 and winding the same along the circumference of a rotary head cylinder 113 provided in an inclined position.

Denoted by 136 and 137 are loading rings turnably disposed on the underside of the base plate 110 one above the other in a concentric relationship.

In the magnetic tape withdrawer unit I, 114 denotes a withdrawer unit base arranged to be slidable in and along a guide slot 119 formed in the base plate 110. 120 denotes a vertical withdrawer pin provided on the withdrawer unit base 114 to withdraw the magnetic tape out of the cassette 101 and, after completion of a tape withdrawing operation, to serve as one guide pin for defining a running path of the magnetic tape.

The withdrawer unit II is constituted symmetrically to the withdrawer unit I and thus will not be described herein.

125 and 125' denote stoppers for limiting respective positions where an operation of the withdrawer units I and II for withdrawing the tape is completed. As shown in FIGS. 20 and 21, the stopper 125 comprises an upper projection 127 having a V-shape recess 126 which serves as a first stopper means, and a lower projection 161 having a U-shape recess 128 which serves as a second stopper means, the both projections being provided to oppose to each other. A flat plane c—c' passing through the center line a—a' of the V-shape recess 126 and the center line b—b' of the U-shape recess 128 is normal to the upper surface of the base plate 110. The U-shape recess 128 has a width s almost equal to the diameter of the vertical withdrawer pin 120 so that the pin 120 may fit into the recess 128 as indicated by phantom lines. An inclined cam surface 132 of the stopper 125 guides a projection piece 118 provided on the withdrawer unit base 114 so as to easily enter a recess 133 which serves as a third stopper means of the stopper 125, when the withdrawer unit I is slid toward the stopper 125 in a direction of an arrow X as shown in FIG. 22, while withdrawing a magnetic tape 104. The stopper 125' is exactly symmetrical to the stopper 125 and thus will not be described herein.

The manner of the magnetic tape withdrawer unit I precisely abutting against the stopper 125 will be next explained with reference to FIGS. 23A–23C. FIGS. 23A and 23C are a top and a bottom plan views of the stopper 125. The withdrawer unit I is moved with rotation of the loading ring 136 to approach the stopper 125 along the sliding guide slot 119 because a boss 116 is snugly fitted into the sliding guide slot 119. Then, the vertical withdrawer pin 120 first abuts against the V-shape recess 126 of the projection 127 serving as the first stopper means. At this time, with the boss 116 snugly fitted into the sliding guide slot 119, the vertical withdrawer pin 120 precisely abuts against the center of the V-shape recess 126 for proper positioning without laterally swinging to the left and right. Next, although force tending to continuously push the vertical withdrawer pin 120 still exists, the upper portion of the vertical withdrawer pin 120 is restricted in its further movement by the V-shape recess 126 and, therefore, only the lower portion of the vertical withdrawer pin 120 is pushed to raise the projection 118 of the distal end of the withdrawer unit I upwards. Thus, the projection piece 118 is brought into abutment against the upper inner surface of the recess 133, serving as the third stopper means of the stopper 125, to be held in a horizontal condition. The lower portion of the vertical withdrawer pin 120 snugly fits into the U-shape recess 128 of the projection 161 serving as the second stopper means, thereby restricting a lateral swing of the lower portion of the vertical withdrawer pin 120 to the left and right.

As explained above, the vertical withdrawer pin 120 is restricted in its position by the V-shape recess 126, the U-shape recess 128 and the upper inner surface of the recess 133, respectively serving as the first, second and third stopper means, in all the directions, i.e., laterally, to and fro, and vertically, so that the vertical withdrawer pin 120 may be held correctly normal to the base plate 110. Under a playback or recording condition, accordingly, the magnetic tape 104 can be brought into proper contact with the rotary head cylinder 113 while engaging with the vertical withdrawer pin 120. Note that operation of the vertical withdrawer pin 120' takes place in the same manner as the vertical withdrawer pin 120 and thus will not be explained herein.

However, the above conventional arrangement has suffered from such a first problem that the structure for positioning of the withdrawer units I and II is quite complicated, the number of parts used is very large, and the extremely high machining precision of respective components is needed to ensure a stable tape running system at all times, thus inviting limitations in reduction of the size, weight, height and manufacturing cost of the loading mechanism.

Stated otherwise, to restrict the positions of the withdrawer units I and II in all the directions, i.e., laterally, to and fro, and vertically, there are necessary the V-shape recess 126, the U-shape recess 128 and the upper inner surface of the recess 133, respectively serving as the first, second and third stopper means, which require a considerable degree of machining precision.

Next, in a conventional VTR, a gear for driving a loading gear comprises a two-stages gear. Two gears making up the two-staged gear are interconnected by a coil spring disposed around the axis such that one gear serves to drive the two-stages gear and the other gear serves to transmit driving force of torque to the loading gear. With this arrangement, when a loading post driven by the loading gear is stopped by a stopper, the one gear is rotated to a larger extent than the other gear against the coil spring to thereby produce force of pressing the loading post against the stopper.

By way of example, in Japanese Patent Application No. 1-267329 (corresponding to JP-A-3-127373 (published on May 30, 1991)) previously proposed by the inventors, as shown in FIG. 24 attached here, a torque of a cam gear 201 is transmitted to a loading main gear 204 through a gear 202 and a gear 203. The torque is further transmitted to a first loading gear 206 through a gear 205 fixed to the same shaft as the loading main gear 204 and, simultaneously, to a second loading gear 209 through a gear 207 and a gear 208 fixed to the same shaft as the gear 207. The loading gears 206 and 209 respectively drive ring gears 210 and 211 on which loading posts (not shown) are provided. In that mechanism, the pair of gears 204 and 205, and gears 207 and 208 each comprise a two-stages gear and are interconnected by respective coil springs 212 and 213 disposed around their axes. The coil spring 212 between the gears 204 and 205 and the coil spring 213 between the gears 207 and 208 take no part in driving the first loading gear 206 and the second loading gear 209, but after the loading posts moving together with the ring gears 210 and 211 are stopped by respective stoppers (not shown) at positions where an operation of loading a magnetic tape is completed, those springs are extended as the gears 204 and 207 further rotate to some extent, whereby the loading posts are resiliently pushed against the stoppers under action of respective spring forces for positive holding of the loading posts.

However, the above conventional VTR has suffered from such a second problem that resiliently pushing the loading posts needs one bias means for each of the loading post at the side of supplying the magnetic tape to the rotary head cylinder and the loading post at the side of taking the magnetic tape out of the rotary head cylinder and, therefore, requires a larger number of gears, which results in enlargement of the height and the area occupied by components. Especially in the case of using a pair of two-stages gears fitted with springs, that problem becomes severer and more disadvantageous in achieving reduction of the size, weight and height.

Moreover, in a conventional VTR, after finishing a loading operation to wind a tape around a cylinder drum having a rotary, a mode shift operation to effect a state of playback, stop, fast forward drive, etc. is effected. Then, the so-called driving force switching mechanism or intermittent motion mechanism is required to effect such a mode shift operation by using the same motor as that for the loading operation. As that type intermittent motion mechanism, use is made of the so-called geneva mechanism.

According to JP-A-63-61442, for instance, a cam gear 224 has a three-stages structure comprising a cam surface portion 224*b*, an intermittent gear portion 224*c* and a full-toothed gear portion 224*d* as shown in FIG. 25 attached here. Also as shown, a geneva gear 225 which is held in mesh with the cam gear 224 and makes an intermittent rotative motion for each turn of the cam gear 224, has a two-stages structure comprising a cam surface portion 225*b* and a full-toothed gear portion 225*c*. Torque is transmitted from a motor (not shown) to the cam gear 225 through the full-toothed gear portion 224*d* and the geneva gear is driven to operate following rotation of the cam gear.

A process of the intermittent motion in the above mechanism will now be explained in detail with reference to FIGS. 26A to 26F which are bottom plan views with relation to FIG. 25.

In a state of FIG. 26A, since the cam surface 225*b* of the geneva gear 225 is locked by the cam surface 224*b* of the cam gear 224, and the full-toothed gear portion 225*c* of the geneva gear 225 is not engaged with the intermittent gear portion 22*c* of the cam gear 224, the geneva gear 225 will not rotate and remains still. When the cam gear 224 is rotated in an anti-clockwise direction from the state of FIG. 26A to shift into a state of FIG. 26B, a tooth 225*c* of the geneva gear 225 starts engaging with one tooth 224*e* of the cam gear 224. When the cam gear 224 is further rotated in the anti-clockwise direction, the geneva gear 225 starts rotating in a clockwise direction as shown in FIG. 26C. After clockwise rotation of the geneva gear over an angla somewhat smaller than 360°, both the gears shift into a state of FIG. 26D. When the cam gear 224 is further rotated in the anti-clockwise direction, a tooth 225*e* of the geneva gear is disengaged from one tooth 224*e* of the cam gear, while a part 224*f* of the cam surface portion 224*b* of the cam gear raises up the cam surface portion 225*b* of the geneva gear as shown in FIG. 26E, followed by shifting to a state of FIG. 26F. When the cam gear 224 is rotated in the anti-clockwise direction from the state of FIG. 26F, the geneva gear 225 will not rotate and remains still because the cam surface portion 225*b* of the geneva gear 225 is held in engagement with the cam surface portion 224*b* of the cam gear 224.

By utilizing the above intermittent motion mechanism such that the cam gear is driven by the motor and a loading gear adapted to directly drive the loading post is held in mesh with the geneva gear, the mode shift motion can be performed using the same motor after finishing and before starting the loading operation of the magnetic tape.

However, the above driving device for the loading posts has suffered from such a third problem to be solved by the present invention that since the so-called geneva mechanism is used as the intermittent motion mechanism, the cam gear has the three-stages structure comprising a cam surface portion, an intermittent gear portion and a full-toothed gear portion, which is extremely disadvantageous in reducing the size, weight and thickness of the entire device. Further, use of the geneva gear is disadvantageous in not only that it has an increased thickness because of the two-stages structure comprising a cam surface portion and full-toothed gear portion, but also that the geneva gear itself is too small to drive the loading post by itself and, eventually, the loading gear for driving the loading post must be meshed with the geneva gear (not shown). Accordingly, force or displacement must be transmitted from the cam gear, as a prime mover part, to the loading gear through one member in the form of a geneva gear, which is additionally disadvantageous in reducing the size, weight and number of parts used.

SUMMARY OF THE INVENTION

The present invention is directed to solve the aforementioned first problem, and its object is to realize a mechanism of positioning a magnetic tape withdrawer unit with a quite simple structure.

In the light of the above object, a magnetic recording/playback apparatus of the invention is arranged to realize positioning of a loading boat by causing a V-shape groove of the loading boat to abut against a stopper.

The positioning of the loading boat is also realized by shifting a position, at which driving force is transmitted from a driving shaft to the loading boat, from a hole to a projection when completing an operation of withdrawing the magnetic tape.

With such an arrangement, when the V-shape groove of the loading boat comes into abutment against the stopper, the loading boat is positioned in such a manner that the V-shape groove restricts a position of the loading boat in a lateral direction and, simultaneously, restricts to-and-fro and vertical positions of the loading boat because an action of force produced upon the abutment between the V-shape groove and the stopper is directed toward the chassis side.

Additionally, since the position at which the driving force is transmitted from the driving shaft to the loading boat can be shifted from the hole to the projection when completing the operation of withdrawing the magnetic tape, there produces force tending to hold down the loading boat about the abutting point between the V-shape groove and the stopper, whereby the loading boat is prevented from floating at its rear end portion from a reference surface.

Further, the present invention is directed to solve the aforementioned second problem, and its object is to provide a loading post driving and pressing device which can eliminate the need of using a two-stages gear fitted with a spring, position two loading posts under pressing by one urging means, and realize reduction of the size, weight and height.

In the light of the above object, according to the present invention, a loading post driving device comprises two loading gears for respectively driving a loading post of the supply side and a loading post of the take-up side, a pendulum gear held in mesh with one of the loading gears, an intermediate gear interposed between the pendulum gear and the other loading gear for making directions of rotation of the two loading gears opposite to each other, a swing plate mounting the pendulum gear and the intermediate gear thereon in such a pivotal manner as able to displace each of the pendulum gear and the intermediate gear within a predetermined range substantially in a circumferential direction of the loading gear held in mesh therewith, urging means for urging the pendulum gear or the intermediate gear to rotate, and a drive gear held in mesh with either one of the two loading gears for driving the one loading gear.

According to such an arrangement, by driving the one loading gear, the drive gear can drive the other loading gear as well through the pendulum gear and the intermediate gear. At this time, the urging means urges the one loading gear for driving the loading post at the supply side and the other loading gear for driving the loading post at the take-up side to rotate in directions opposite to each other. As a result, during completing a loading operation, the two loading posts, i.e., the loading post of the supply side and the loading post of the take-up side, can be positioned under pressing by only one urging means.

If the axes of rotation of the pendulum gear and the intermediate gear were fixed, it would be impossible that the supply side loading post and the take-up side loading post are pressed against respective stoppers for positioning at the same time during completing the loading operation. In other words, there would always occur such a phenomenon that either one of the loading posts is positioned at an earlier time and the other loading post does not abut against the stopper. According to the arrangement of the invention, however, since the pendulum gear and the intermediate gear are pivotally supported on the swing plate, an adjustment is made by the swing plate displacing to some degree even if the timings of pressing the supply side loading post and the take-up side loading against the respective stoppers are slightly deviated from each other. As a result, both the supply side loading post and the take-up side loading post can be surely positioned against the respective stoppers under pressing.

In addition, the invention is directed to solve the aforementioned third problem, and its object is to provide a loading post driving device in which a gear serving as a prime mover part has the two-stages structure to realize reduction of the size, weight and thickness, and driving force can be directly transmitted from the gear serving as a prime mover part to a large loading gear by using no geneva gear.

In the light of the above object, according to the present invention, a loading post driving device comprises a loading gear for driving a loading post and having a toothless region, and a drive gear having an intermittent gear portion to be able to engage with or disengage from the loading gear through the toothless region, wherein the toothless region is positioned in the loading gear so that the loading gear can be engaged with or disengaged from the intermittent gear portion of the drive gear at a position where an operation of loading a tape is completed, i.e., a loading terminal position, and urging means is provided to force the loading gear to rotate at the loading terminal position in a direction of completing the loading operation.

According to the above structure, when the drive gear serving as a prime mover part rotates, the loading gear is driven and, immediately before completing the loading operation, the intermittent gear portion of the drive gear is disengaged from the toothless region of the loading gear. At this time, since the loading gear is forced by the urging means to rotate in the direction of completing the loading operation, the loading post is positioned under pressing. Also, even when the drive gear is further rotated to perform a mode shift operation, the so-called intermittent motion can be realized without any troubles because of the loading gear being disconnected from the transmission mechanism. Conversely, during an operation of unloading the tape, the drive gear is rotated backward, the intermittent gear portion of the drive gear is engaged with the toothless region, causing the loading gear to rotate against the urging means in a direction of unloading the tape. The toothless region provided in the loading gear ensures positive engagement or disengagement between the loading gear and the intermittent gear portion of the drive gear. Thus, the drive gear is formed into the two-stages structure comprising the portion to which the driving from a motor is transmitted, and the intermittent gear portion, whereby the loading gear can be directly driven by the drive gear without using a geneva gear or the like, which greatly contributes to reduction of the size, weight, height and number of parts used.

BRIEF DESCRIPTION OF THE DRAWINGS

FIG. 8 is a top plan view showing principal parts of the loading mechanism, the view illustrating a loading guide at the supply side and a loading guide at the take-up side located in an opposite relation.

DETAILED DESCRIPTION OF THE PREFERRED EMBODIMENT

One preferred embodiment of the invention will be described hereinafter with reference to the drawings.

Figure 1:
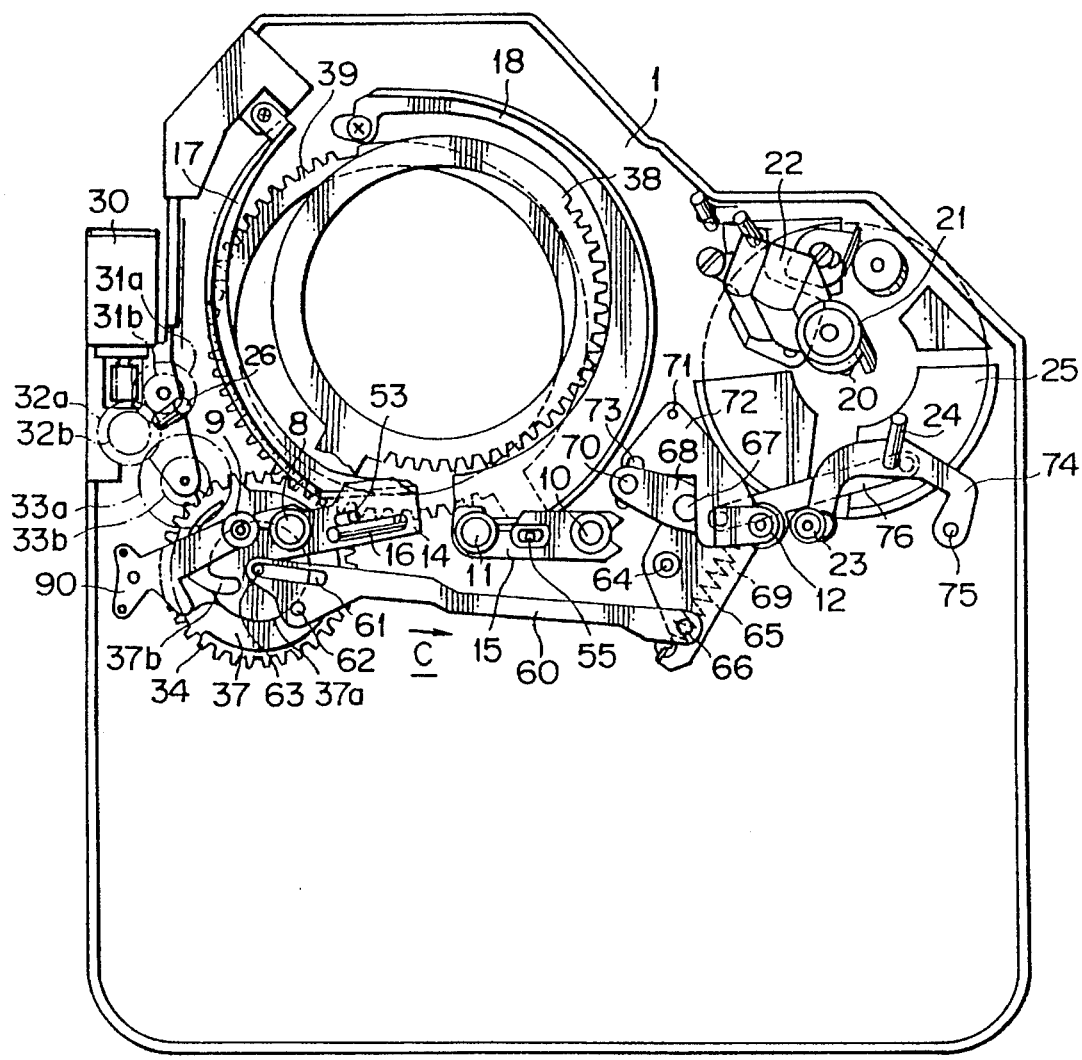
FIG. 1 is a top plan view showing a loading mechanism in a magnetic recording/playback apparatus according to one embodiment of the invention.
Figure 2:
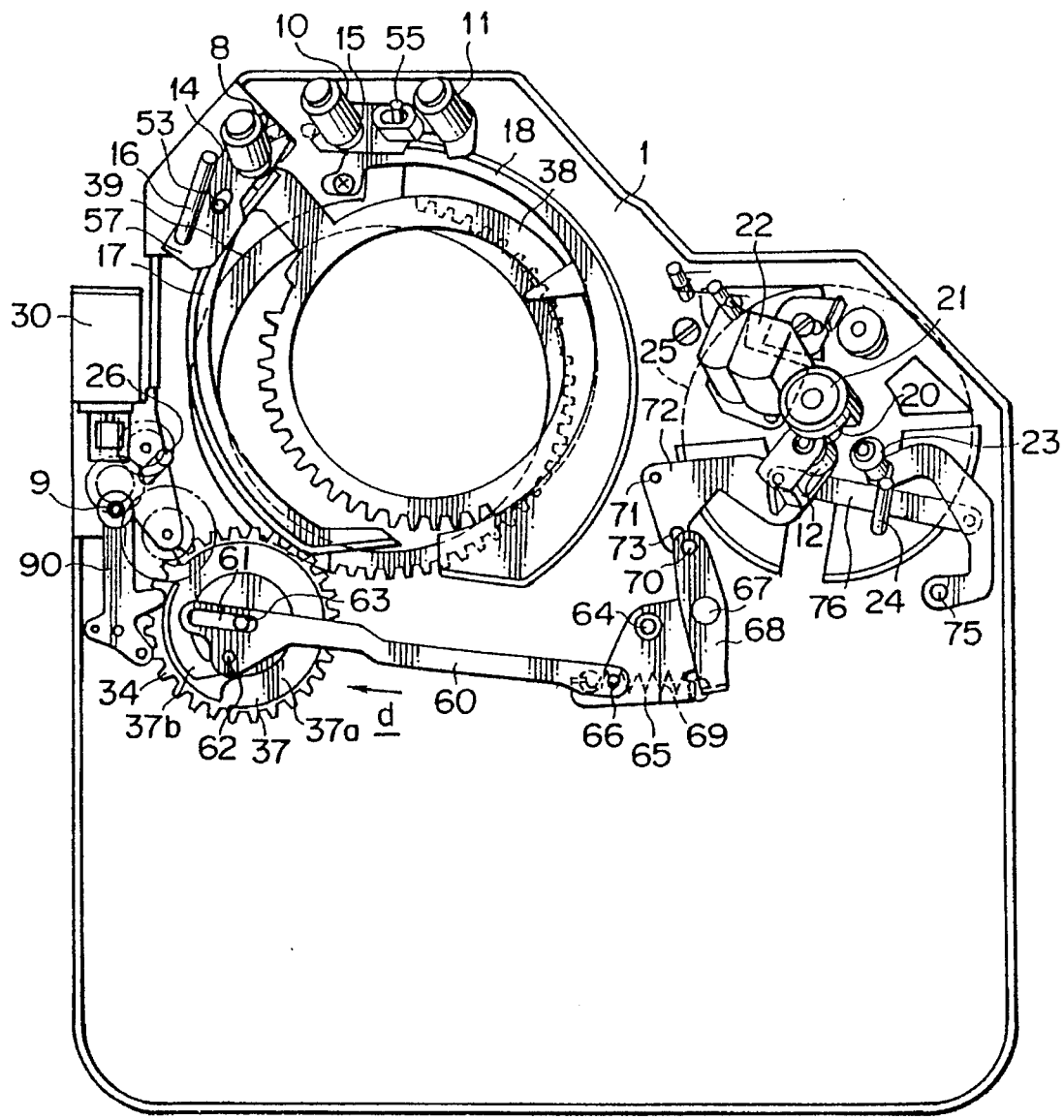
FIG. 2 is a top plan view showing the loading mechanism in the embodiment of FIG. 1.
Figure 3:
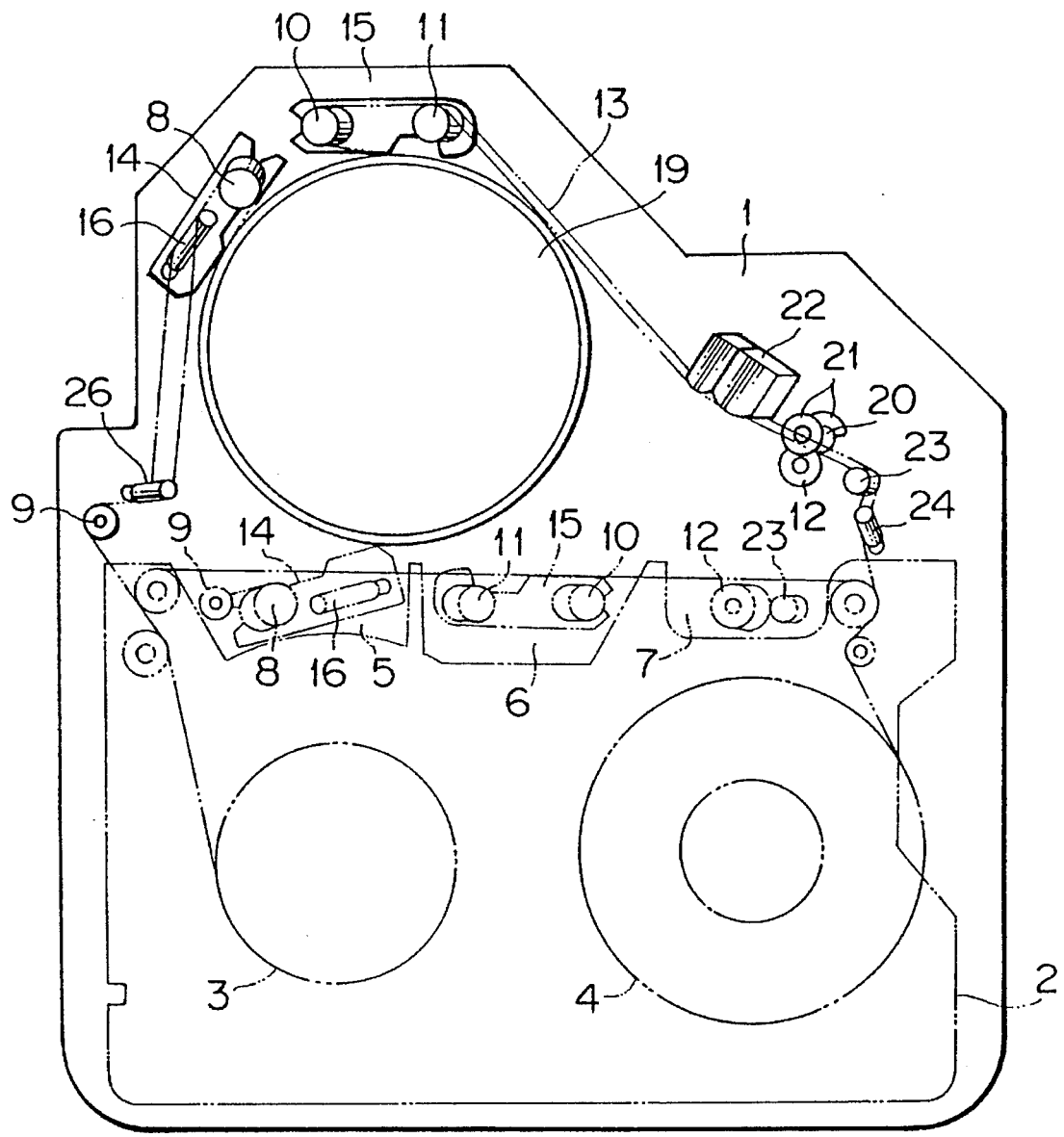
FIG. 3 is a top plan view of illustrating a running path of a magnetic tape in the embodiment of FIG. 1.
Figure 4:
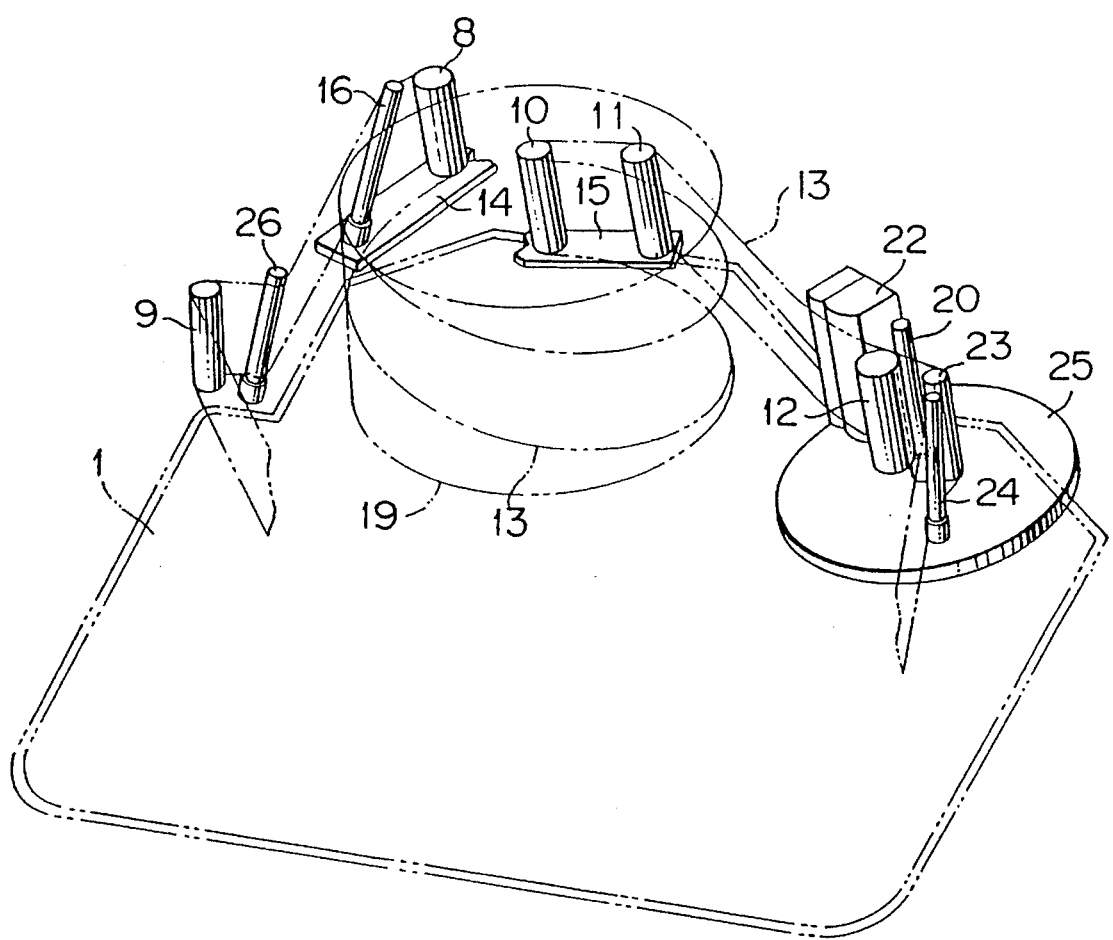
FIG. 4 is a perspective view of illustrating the running path of the magnetic tape.
Figure 5:
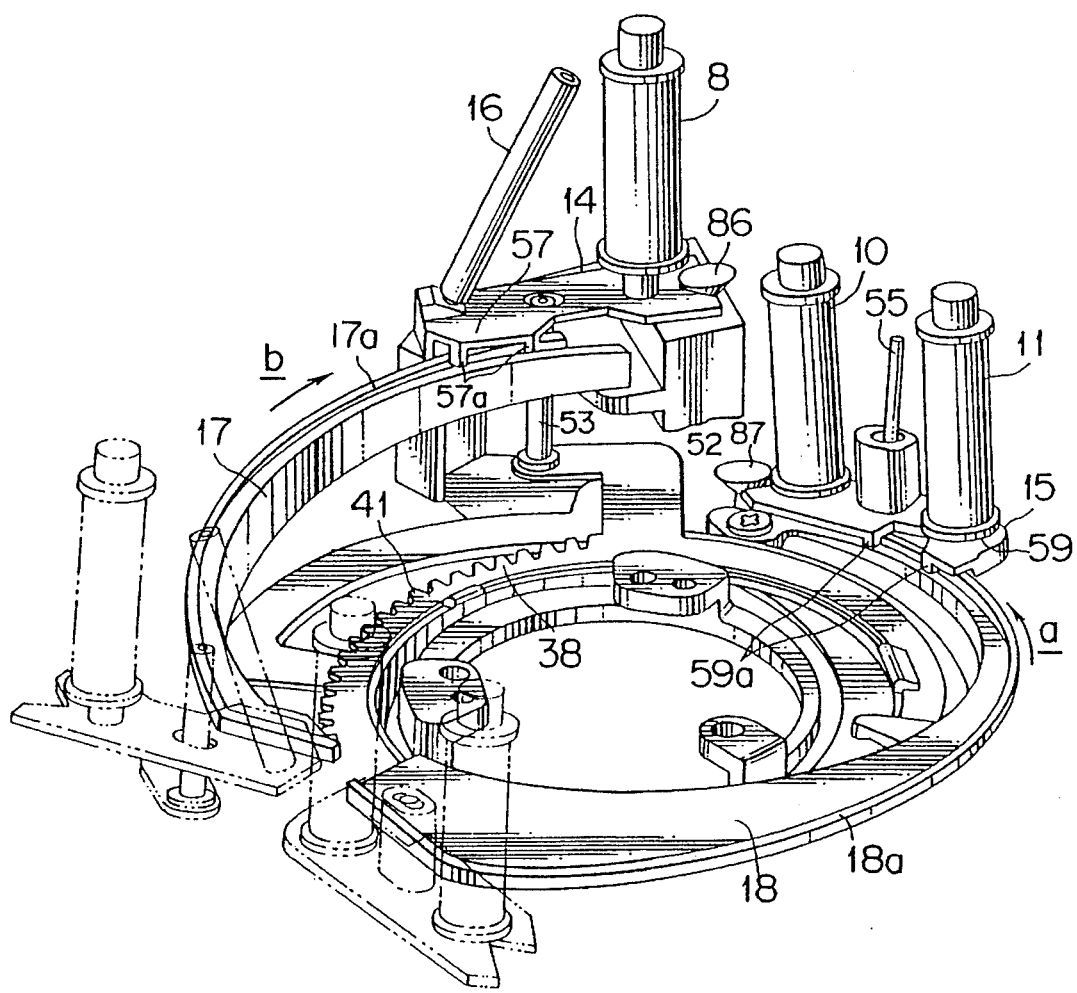
FIG. 5 is a perspective view showing the loading mechanism in the embodiment of FIG. 1.
Figure 6:
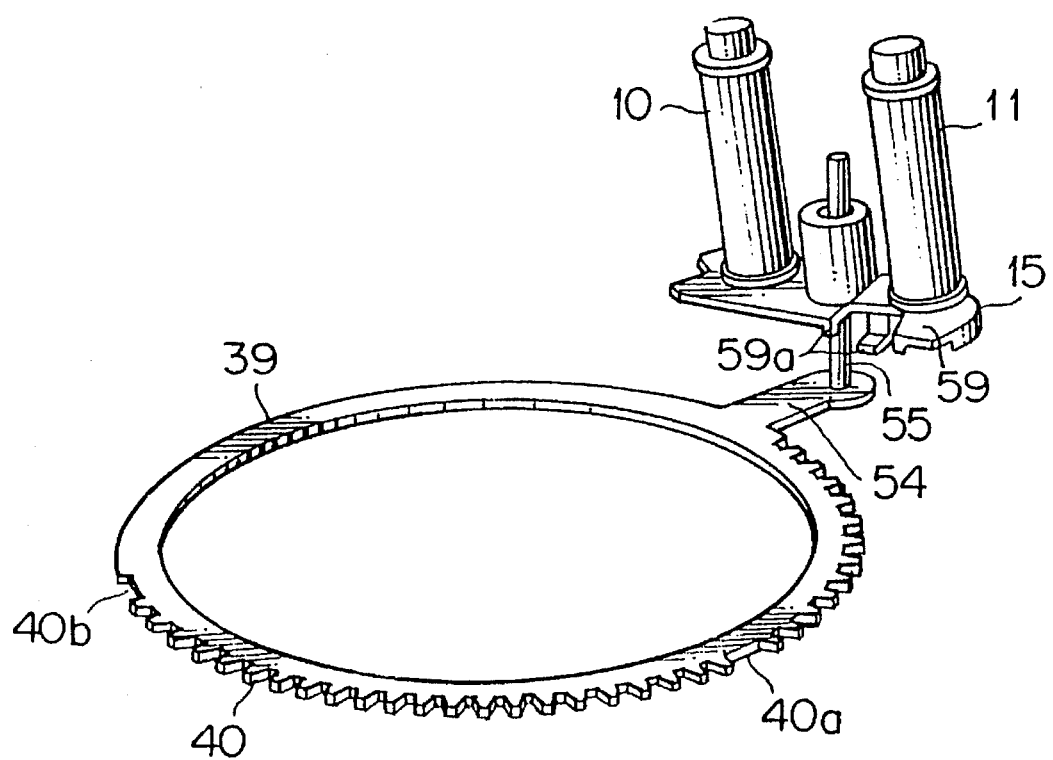
FIG. 6 is a perspective view showing principal parts of the loading mechanism.

FIGS. 1 and 2 are top plan views of a loading post driving device in a magnetic recording/playback apparatus according to one example of the invention before and after an operation of loading a magnetic tape, respectively, FIG. 3 is a schematic top plan view of illustrating a running path of the magnetic tape in the loading post driving device, FIG. 4 is a perspective view showing a principal section of the running path, and FIGS. 5 and 6 are perspective views showing principal parts of the loading post driving device.

First, an operation of a loading post will be briefly explained by referring to FIGS. 1 to 4. In FIGS. 3 and 4, numeral 1 denotes a chassis and 2 a tape cassette charged on the chassis 1. A supply reel 3 and a take-up reel 4 are disposed in the tape cassette 2. When the tape cassette 2 is charged on the chassis 1, a loading roller post 8 at the supply side, a tension post 9 and an inclined post 16; a first and a second loading roller posts 10 and 11 at the take-up side; and a pinch roller 12 and an auxiliary guide post 23 are positioned inside of a magnetic tape 13 and in recessed portions 5, 6 and 7 formed in the front edge surface of the tape cassette 2, respectively.

Denoted by 14 and 15 are a boat at the supply side and a boat at the take-up side on which the supply side loading roller post 8 and the take-up side first and second loading roller posts 10 and 11 are mounted upwards, respectively. The supply side boat 14 is also provided with the inclined post 16, in addition to the supply side loading roller post 8, the inclined post 16 being inserted into the recessed portion 5 together with the supply side loading roller post 8.

Denoted by 17 and 18 are an arc shape loading guide at the supply side and an arc shape loading guide at the take-up side both disposed along the circumference of a rotary head cylinder 19 as shown in FIGS. 1 and 2, the guides 17 and 18 operating to guide the supply side boat 14 and the take-up side boat 15 during an operation of loading the magnetic tape 13, respectively. As shown in FIG. 5, the supply side loading guide 17 is arranged in such a manner that it becomes higher as it comes nearer to a position where the tape loading operation is completed, and the take-up side loading guide 18 is arranged in such a manner that it becomes lower as it comes nearer to a position where the tape loading operation is completed.

The rotary head cylinder 19 is attached substantially vertically with respect to the chassis 1. When the supply side boat 14 is moved along the supply side loading guide 17, the supply side loading roller post 8 winds the magnetic tape 13 withdrawn out of the supply reel 3 around the rotary head cylinder 19 in a direction extending obliquely upwardly toward the left side as viewed in FIG. 4. When the take-up side boat 15 is moved along the take-up side loading guide 18, the take-up side loading roller post 10 winds the magnetic tape 13 withdrawn out of the take-up reel 4 around the rotary head cylinder 19 in a direction extending obliquely downwards toward the right side as viewed in FIG. 4.

At this time, the supply side loading roller post 8 is in a position of being inclined slightly backwards at the position where the tape loading operation is completed, because of the slope of the loading guide 17 which becomes gradually higher toward that loading terminal position; and the take-up side first and second loading roller posts 10 and 11 are in positions (postures) of being inclined slightly forwards at the other position where the tape loading operation is completed, because of the slope of the loading guide 17 which becomes gradually lower toward that other loading terminal position.

Thus, as shown in FIG. 4, the magnetic tape 13 which is fed to the rotary head cylinder 19 by means of the supply side loading roller post 8 is introduced from the upper portion of the rotary head cylinder 19 obliquely downwards toward the lower portion thereof. At a position where the magnetic tape 13 leaves from the rotary head cylinder 19, the magnetic tape 13 is turned so as to be introduced into a gently sloped path of the tape extending obliquely upwards from the lower portion of the cylinder 19 through the take-up side first loading roller post 10. While being maintained to be slightly inclined forwards by the take-up side second loading roller post 11, the magnetic tape 13 is introduced obliquely upwards along the gently sloped path.

Denoted by 20 is a capstan provided on the chassis 1 outside a location where the tape cassette 2 is to be charged, the capstan 20 being supported at its upper and lower ends by bearings 21 and attached to the chassis 1 such that it is inclined relative to the chassis at an angle substantially equal to those of the take-up side loading roller posts 10 and 11 at the loading terminal position.

The inclined capstan 20 is brought into full contact with the magnetic tape 13 over its entire width which is introduced obliquely upwards from the take-up side loading roller post 11 along the sloped path and is inclined forwards. During completing the tape loading operation, the capstan 20 is in press-contact with the pinch roller 12 which is moved from the position of the recessed portion 7 of the tape cassette 2 so that the magnetic tape 13 is held between the capstan 20 and the pinch roller 12 to be driven. Incidentally, the pinch roller 12 is arranged to have an inclination at the same angle as that of the capstan 20 in order to be full contact with the capstan 20 over entire width of the tape.

Denoted by 22 is an audio-control head provided at a location in the vicinity of the capstan 20 between the take-up side second loading roller post 11 at the loading terminal position and the capstan 20. The audio-control head 22 is attached to the chassis 1 in such a manner that it is inclined at the same angle as that of the capstan 20 in order to facilitate a contact between the audio-control head 22 and the magnetic tape 13 which is inclined forwards and introduced obliquely upwards along the sloped path from the take-up side second loading roller post 11 to the capstan 20.

Denoted by 23 is an auxiliary guide post which moves in interlock with the pinch roller 12 such that it is positioned in the recessed portion 7 of the tape cassette 2 before starting the tape loading operation, and it moves together with the pinch roller 12 during completing of the tape loading operation, thereby guiding the magnetic tape 13 traveling between the capstan 20 and the pinch roller 12 to lead to a fixed inclined post 24. As regards the magnetic tape 13 fed from the take-up side second loading roller post 11 through the capstan 20 and the auxiliary guide post 23 while maintaining the forwardly-inclined posture, torsion of the magnetic tape 13 generated when the tape traveling is converted from the sloped path into a horizontally running path is corrected by the inclined fixed post 24 which is slantingly attached to the chassis 1 before the magnetic tape 13 reaches the tape cassette 2, then being wound around the tape-up reel 4 of the tape cassette 2. Denoted by 25 is a capstan motor for driving the capstan 20, the motor 25 being inclinedly fixed to the chassis 1. According to such an arrangement, it becomes unnecessary to provide the capstan 20 below the position where the tape cassette 2 is to be charged. Therefore, a height of the chassis 1 is avoided from being increased so that it is readily possible to realize a thin (or small-height) magnetic recording/playback apparatus.

Next, the description concerning a driving device for the loading posts in the magnetic recording/playback apparatus according to one embodiment of the invention will be given below.

Figure 7A:
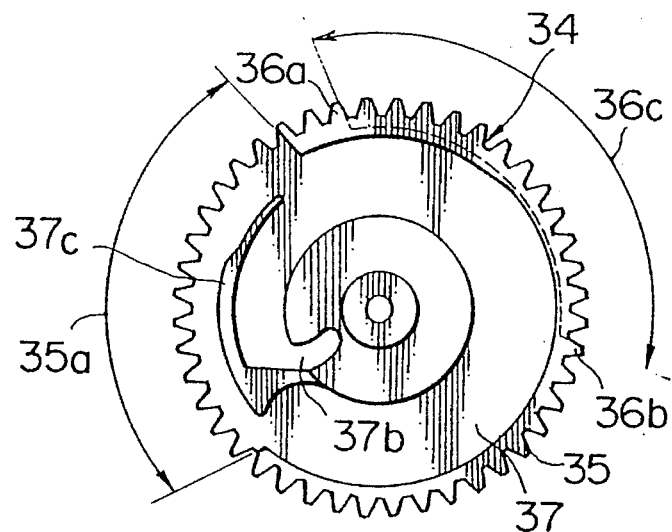
FIG. 7A is a top plan view of a cam gear in the embodiment of FIG. 1.
Figure 7B:
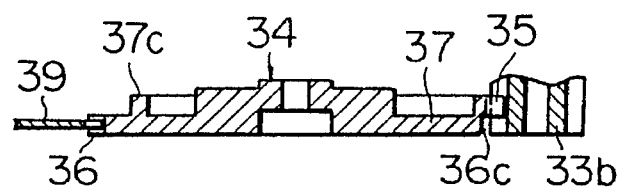
FIG. 7B is a vertical cross-sectional view of the cam gear in FIG. 7A.
Figure 7C:
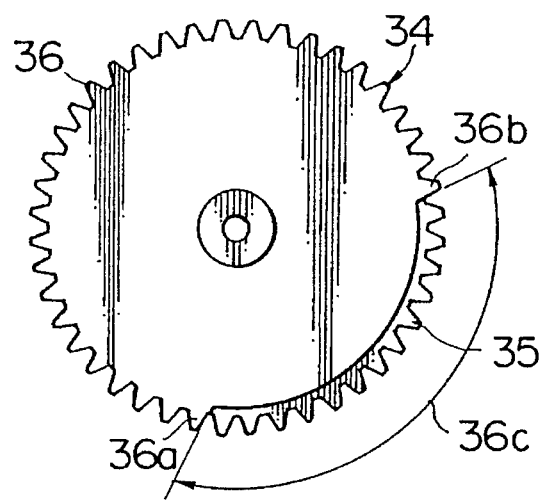
FIG. 7C is a bottom plan view of the cam gear in FIGS. 7A and 7B.

Referring again to FIG. 1, driving force of a loading motor 30 is transmitted to a cam gear 34 through a two-stages gear comprising gears 32a and 32b, and a two-stages gear comprising gears 33a and 33b. As shown in FIGS. 7A, 7B and 7C, the cam gear 34 is formed in its upper half with a first intermittent gear portion 35 which has a toothless region 35a in its part and is meshed with the gear 33b to transmit the driving force of the loading motor 30, and in its lower half with a second intermittent gear portion 36 which has a toothless region 36a in its part and is used for transmitting the driving force to the loading roller posts 10, 11 through a takeup side ring gear 39.

While the first intermittent gear portion 35 has the toothless region 35a, the provision of the toothless region 35a is to make a part of a tension regulator arm 90, which moves the tension post 9 during the tape loading operation, abutted against a cam wall 37c provided on the first intermittent gear portion 35. Insofar as the tension regulator arm 90 can be controlled by any other means, the first intermittent gear portion 35 may be in the form of a full-toothed gear of which teeth are formed on the entire outer periphery.

Furthermore, a cam portion 37 is formed on the top surface of the cam gear 34 and used for controlling the pinch roll 12 to press-contact with or separate from the capstan 20. Since the first and second intermittent gear portions 35, 36 and the cam portion 37 are integrally formed into the cam gear 34 as one piece, the thickness of the cam gear 34 can be reduced.

The mechanism for driving the loading roller posts 8, 10 and 11 by the second intermittent gear portion 36 of the cam gear 34 will now be described with reference to FIGS. 9A and 9B which are top plan views of a gear train. Denoted by 38 is a ring gear at the supply side for driving the supply side loading roller post 8 and 39 is a ring gear at the take-up side for driving the take-up side loading roller posts 10, 11, these ring gears 38 and 39 being provided below the rotary head cylinder 29 in such a manner that the center points of rotation of the ring gears are deviated from each other. A teeth region 40 extending over a predetermined range on the outer periphery of the take-up side ring gear 39 is arranged so as to mesh with the second intermittent gear portion 36 of the cam gear 34. There are respectively provided first and second toothless regions 40a and 40b at intermediate and rear end portions of the teeth region 40 when viewed in a direction of an arrow a which denotes a direction of rotation of the ring gear 39 during loading the magnetic tape, the first and second toothless regions being capable of engaging with or disengaging from terminal ends 36a and 36b of the second intermittent gear portion 36 for the purpose of ensuring the start-up of the loading operation.

A teeth region 41 extending over a predetermined range on the outer periphery of the supply side ring gear 38 is cooperatingly connected with the teeth region 40 of the supply side ring gear 39 through an intermediate gear 42, one gear 43a of a two-stages pendulum gear 43 held in mesh with the intermediate gear 42, and the other gear 43b of the pendulum gear 43. The intermediate gear 42 and the pendulum gear 43 are pivotally mounted on a swing plate 45 which is swingably attached at its one end to a shaft 44 provided on the chassis 1. A shaft 47 which is mounted upwardly on the chassis 1 is fitted into an elongated opening 46 formed at the other end of the swing plate 45 in order to control swinging movement of the plate 45.

Figure 11:
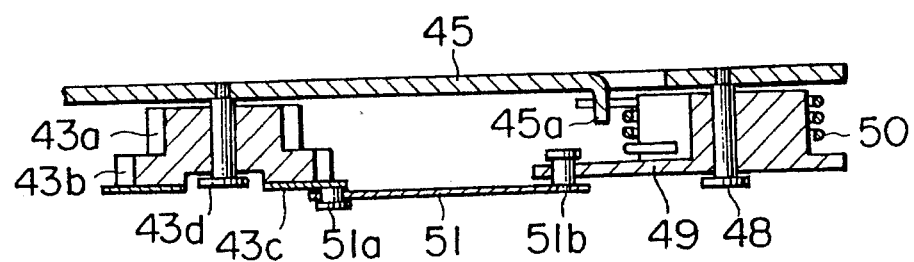
FIG. 11 is a cross-sectional view showing an arrangement of a swinging plate in the embodiment of FIG. 1.

Also as seen from a cross-sectional view of FIG. 11, the pendulum gear 43 is provided integrally with a plate 43c. Denoted by 49 is a charge arm rotatably supported by a shaft 48 which is mounted upwards on the swing plate 45, with a torsion coil spring 50 fitted around the outer circumference of the shaft 48. The torsion coil spring 50 has one end secured to the charge arm 49 and the other end secured to a bent portion 45a of the swing plate 45. As a result, the charge arm 49 is always urged to rotate in a direction of an arrow A in FIG. 9B.

Denoted by 51 is a link which has one end rotatably connected with the plate 43c by a pin 51a and the other end rotatably connected with the charge arm 49 by a pin 51b.

Figure 9A:
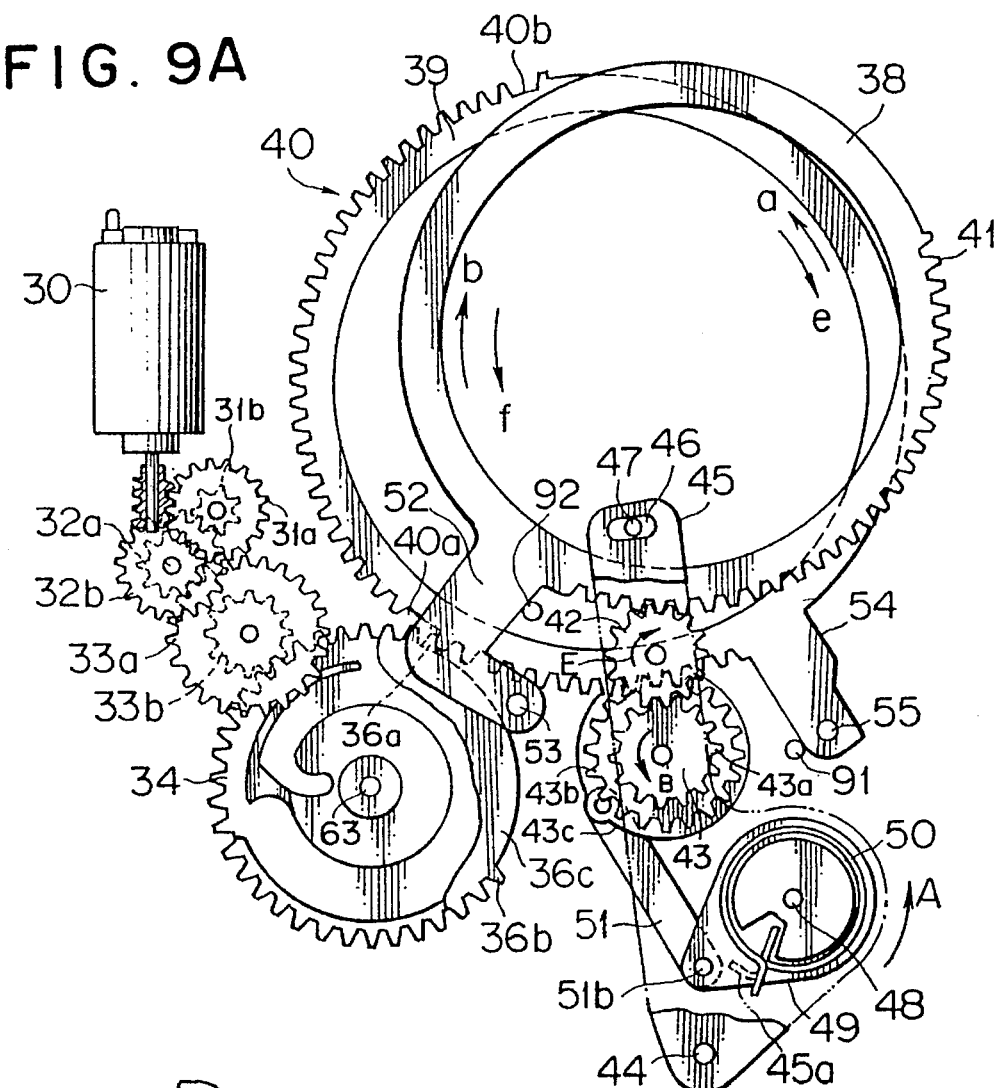
FIG. 9A is a view showing principal parts of FIG. 1 in detail, i.e., a top plan view of illustrating an operation of loading the magnetic tape.
Figure 9B:
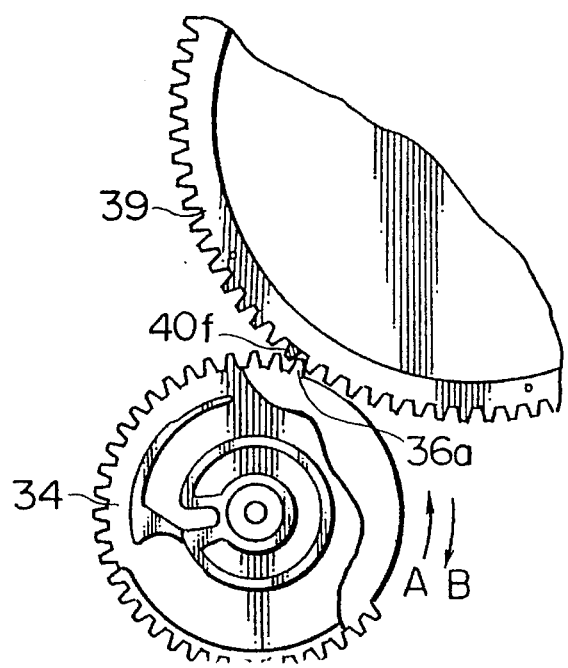
FIG. 9B is a view showing principal parts of FIG. 9A.

According to such an arrangement, the pendulum gear 43 is always urged through the link 51 in a direction of an arrow B in FIG. 9B. While the pendulum gear 43 is making one round, the charge arm 49 is forced to present reciprocal swing movement about the shaft 48.

The supply side ring gear 38 is provided with an arm 52 at the front end of the teeth region 41 thereof when viewed in a direction of an arrow b which denotes a direction of the rotation of the ring gear 38 during loading the magnetic tape. The arm 52 has a drive shaft 53 of the supply side which is attached to extend upright at the distal end portion of the arm 52. The take-up side ring gear 39 is provided with an arm 54 at the front end of the teeth region 40 thereof when viewed in the direction of the arrow a which denotes the direction of rotation of the ring gear 39 during loading the magnetic tape. The arm 54 has a drive shaft 55 at the take-up side which is attached to extend upright at the distal end portion of the fixed arm 54. As will be seen from FIG. 5, the supply side boat 14 is attached to the supply side drive shaft 55 vertically movably. The supply side boat 14 includes at its rear and a holder portion 57 engaging with a stepped portion 17a provided along the outer periphery of the supply side loading guide 17. The holder portion 57 has a pair of claws 57a engaging with the lateral face of the stepped portion 17a. Thus, the supply side boat 14 is guided along the supply side loading guide 17.

Likewise, as will be seen from FIGS. 5 and 6, the take-up side boat 15 is attached to the take-up side drive shaft 55 vertically movably. The take-up side boat 15 includes at its rear end a holder portion 59 engaging with a stepped portion 18a provided along the outer periphery of the take-up side loading guide 18. The holder portion 59 has a pair of claws 59a engaging with the lateral face of the stepped portion 18a. Thus, the supply side boat 14 is guided along the take-up side loading guide 18.

The supply side drive shaft 53 and the take-up side drive shaft 55 are designed so as to move along the outer peripheries of the supply side loading guide 17 and the take-up side loading guide 18, each having an arc shape, when the supply side ring gear 38 and the take-up side ring gear 39 rotate in the direction of the arrow b and in the direction of the arrow a during loading the magnetic tape, respectively. In this way, the supply side boat 14 and the take-up side boat 15 are guided stably without disconnecting from the outer peripheries of the supply side loading guide 17 and the take-up side loading guide 18, respectively, in course of the loading operation of the tape. Moreover, the supply side boat 14 is forced to gradually ascend to become higher as it comes nearer to the loading terminal position, while the take-up side boat 15 is forced to gradually ascend to become lower as it comes nearer to the loading terminal position.

Figure 15A:
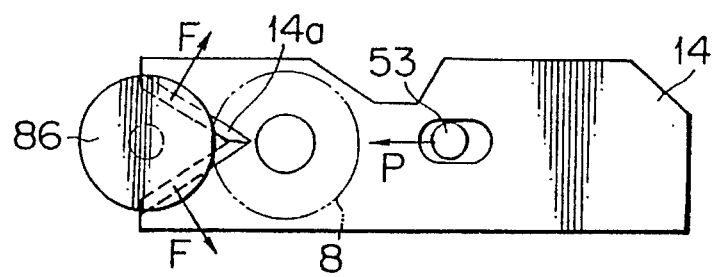
FIG. 15A is a top plan view of illustrating an operation of positioning a loading boat at the supply side in the embodiment of FIG. 1.
Figure 15B:
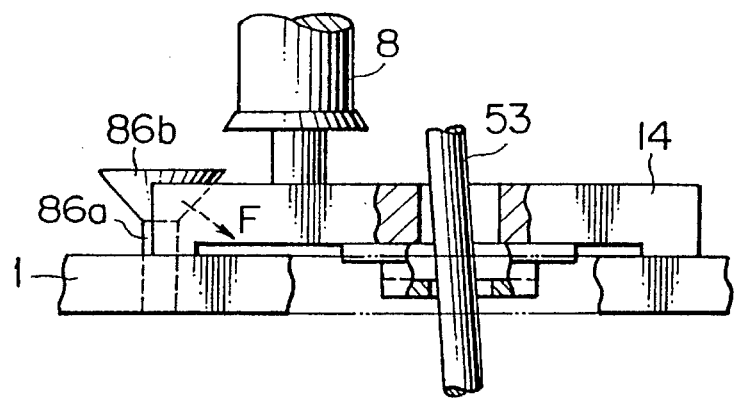
FIG. 15B is a side view of illustrating an operation of positioning the loading boat at the supply side jointly with FIG. 15A.
Figure 15C:
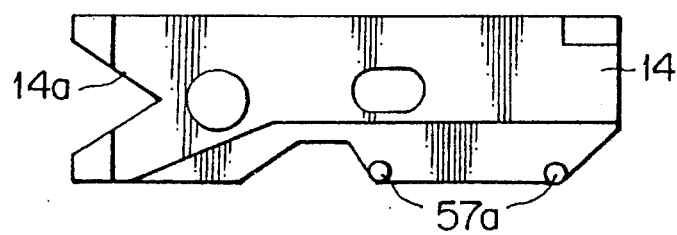
FIG. 15C is a bottom view of illustrating an operation of positioning the loading boat at the supply side jointly with FIGS. 15A and 15B.
Figure 15D:
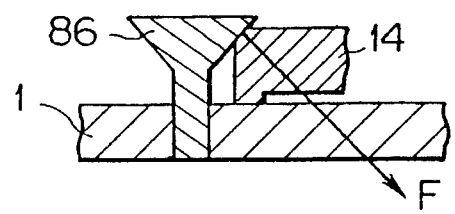
FIG. 15D is a longitudinal sectional view of principal parts of FIG. 15A or 15B.

The mechanism of positioning the supply side boat 14 and the take-up side boat 15 at the respective loading terminal positions will now be described with reference to the drawings. FIGS. 15A–15D is a set of views of illustrating the mechanism of positioning the supply side boat 14; i.e., FIG. 15A is a top plan view, FIG. 15B is a side view, FIG. 15C is a bottom view, and FIG. 15D is a cross-sectional view of principal parts. Note that the components are illustrated in the simplified form for brevity of the drawing and convenience of the description.

In the drawings, 86 denotes a stopper mounted on the chassis 1 in an upright position, the stopper 86 comprising a pin 86a and a conical pressing portion 86b located above the pin 86a. 14a denotes a V-shape groove provided in the front end of the supply side boat 14 and having an inclined region. The supply side boat 14 is also provided at the bottoms of its front and rear end portions with reference surfaces which are brought into abutment against corresponding reference surfaces of the chassis 1 provided in the loading terminal position to enable in high-precision positioning.

As shown in FIGS. 5 and 15A and 15D, as the supply side ring gear 38 rotates, the supply side boat 14 is guided along the supply side loading guide 17 so that the V-shape groove 14a comes into abutment against the stopper 86 at the loading terminal position for positioning the supply side boat 14.

More specifically, at the loading terminal position, since the driving force in a direction of an arrow P is always applied to the supply side half 14 through the supply side drive shaft 53 under at an action of the swing plate 45 (described later), the V-shape groove 14a serves to restrict a position of the supply side boat 14 in the lateral direction upon the V-shape groove 14a abutting against the stopper 86. Since forces in directions of arrows F simultaneously impose on the supply side boat 14, the position of the supply side boat 14 is also restricted in the to-and-fro and vertical directions at the same time.

While the V-shape groove 14a abuts against the stopper 86 through linear contact in this embodiment, the present invention is not limited thereto and a similar effect can be obtained through any of other plane and point contacts as well. Also, the pressing portion 86b of the stopper 86 and the V-shape groove 14a are not limited to the illustrated configurations.

Figure 16A:
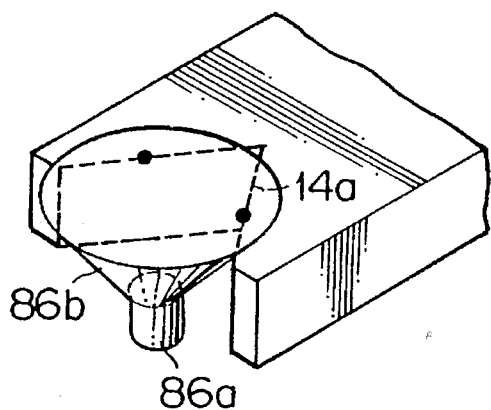
FIG. 16A is a perspective view of principal parts showing a mechanism of positioning the loading boat according to a first modification.
Figure 16B:
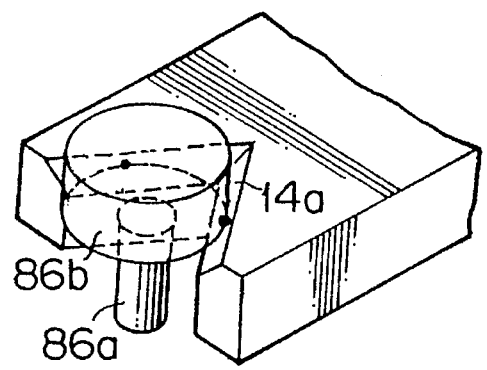
FIG. 16B is a perspective view of principal parts showing a mechanism of positioning the loading boat according to a second modification.
Figure 16C:
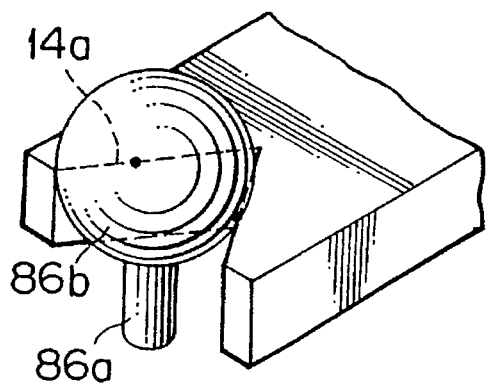
FIG. 16C is a perspective view of principal parts showing a mechanism of positioning the loading boat according to a third modification.
Figure 16D:
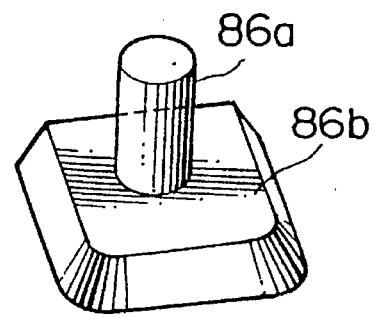
FIG. 16D is a perspective view of principal parts showing a mechanism of positioning the loading boat according to a fourth modification.

One example of point-contact arrangement may be obtained, as shown in FIG. 16A, by forming the pressing portion 86b into a conical shape and providing no inclined region in the V-shape groove 14a. Another example of point-contact arrangement may be obtained, as shown in FIG. 16B, by forming the pressing portion 86b into a cylindrical shape and providing an inclined region in the V-shape groove 14a. Still another example of point-contact arrangement may be obtained, as shown in FIG. 16C, by forming the pressing portion 86b into a spherical shape and providing no inclined region in the V-shape groove 14a. Alternatively, as shown in FIG. 16D, the pressing portion 86b may be formed into not an entirely conical shape like the illustrated embodiment, but a partly conical shape only in those regions coming into abutment against the V-shape groove, including nearby regions.

Although the positioning mechanism at the supply side is described in this embodiment, the positioning mechanism at the take-up side is similarly arranged and thus the description thereof will not be repeated.

Figure 17A:
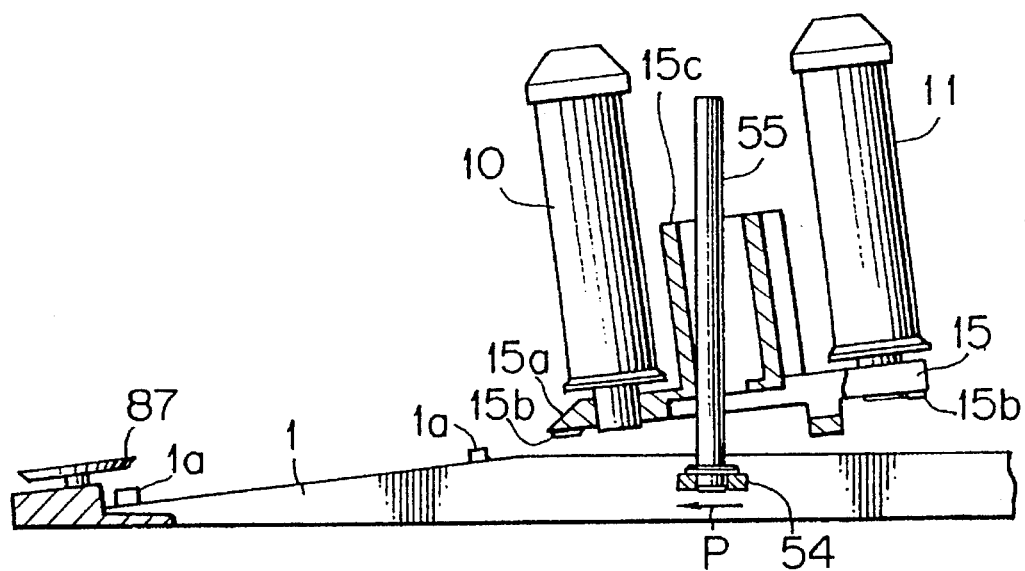
FIG. 17A is a side view with principal parts broken away for explaining a phenomenon which is expected to occur during an operation of positioning the loading boat at the take-up side, jointly with FIG. 17B.
Figure 17B:
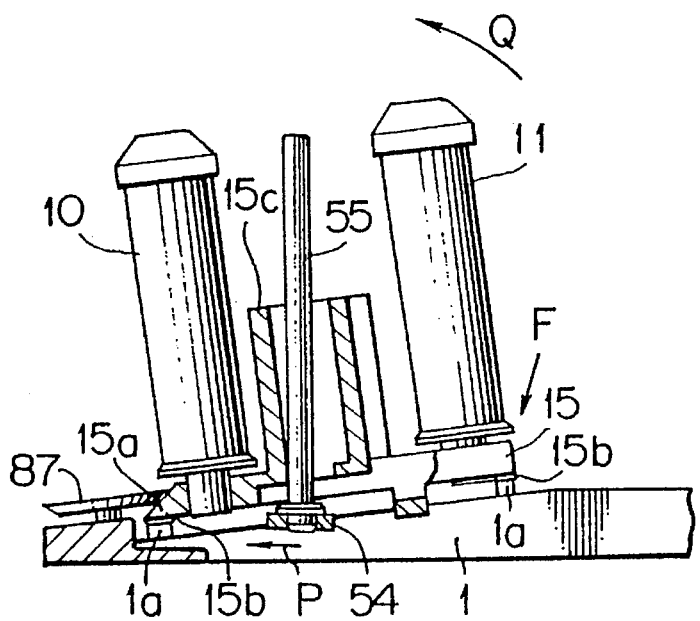
FIG. 17B is a side view with principal parts broken away for explaining a phenomenon which is expected to occur during an operation of positioning the loading boat a the take-up side, jointly with FIG. 17A.
Figure 18A:
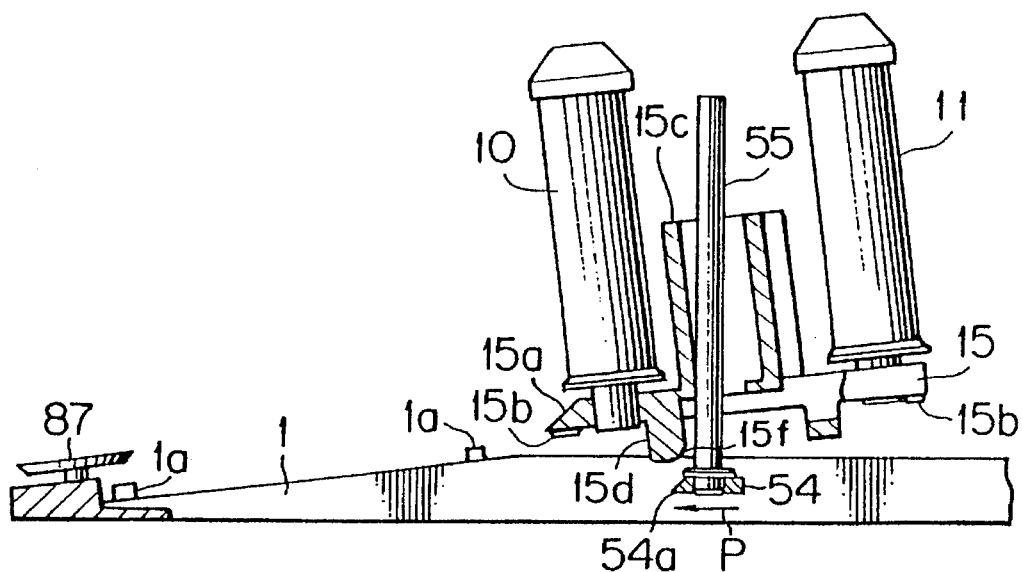
FIG. 18A is a side view with principal parts broken away, showing the mechanism of positioning the loading boat at the take-up side jointly with FIG. 18B, the loading boat in the view being modified from that shown in FIGS. 17A and 17B.
Figure 18B:
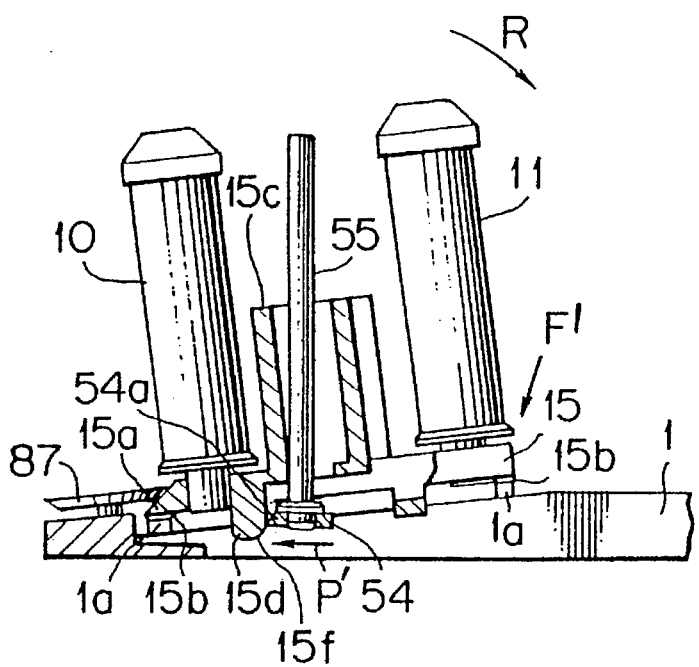
FIG. 18B is a side view with principal parts broken away, showing the mechanism of positioning the loading boat at the take-up side jointly with FIG. 18A, the loading boat in the view being modified from that shown in FIGS. 17A and 17B.
Figure 19:
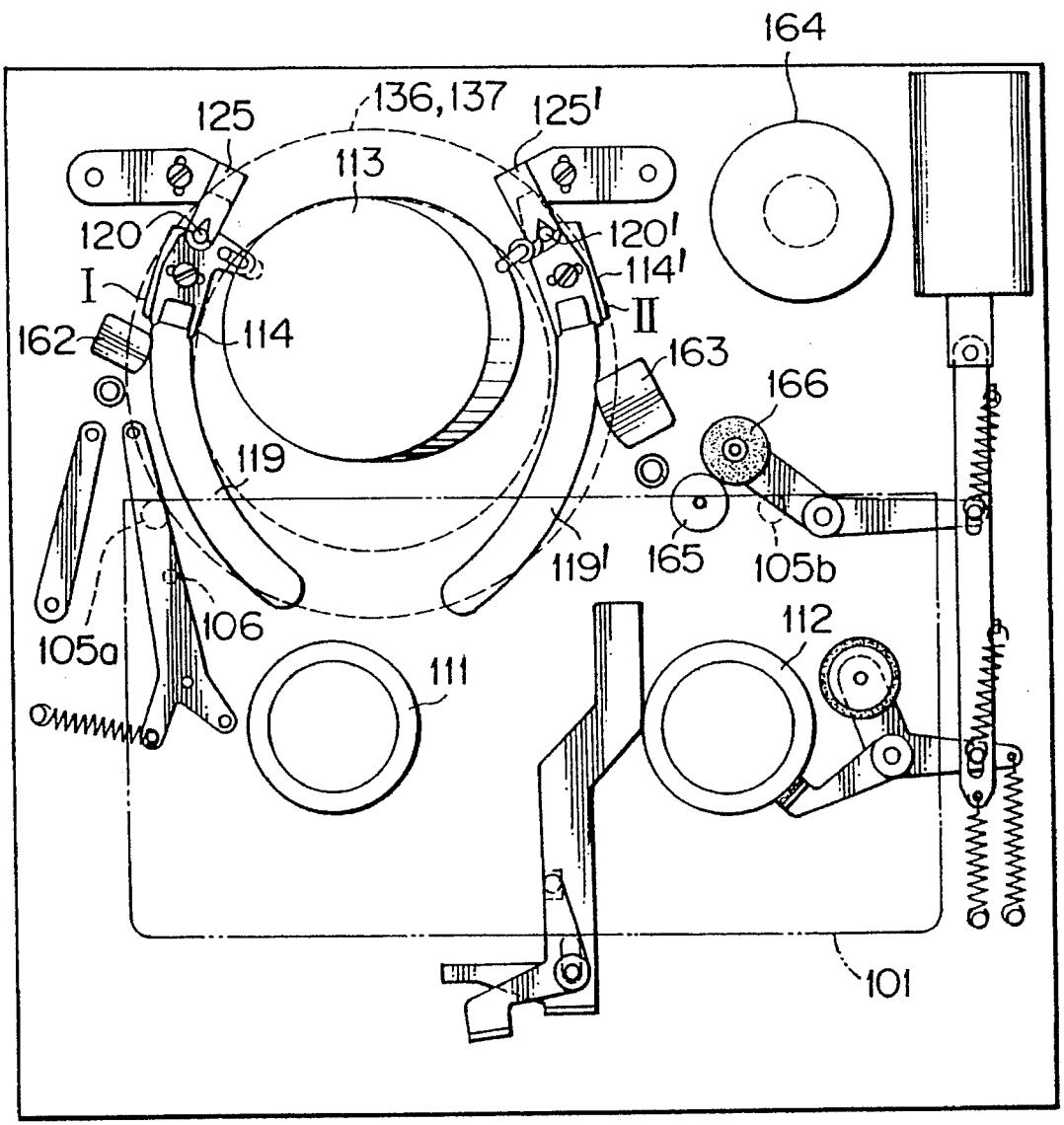
FIG. 19 is a top plan view showing a loading mechanism in the prior art.
Figure 20A:
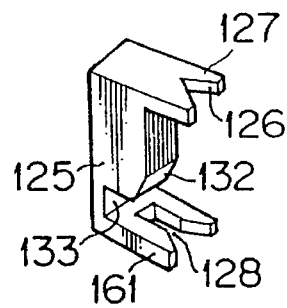
FIGS. 20A–20D are views for explaining a positioning mechanism in the prior art.
Figure 20B:
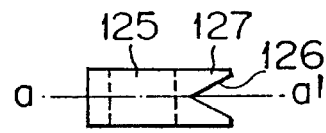
Figure 20C:
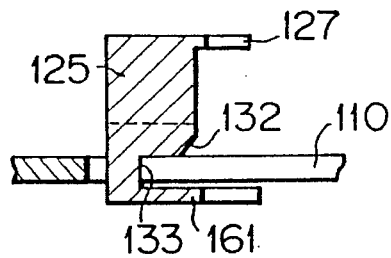
Figure 20D:
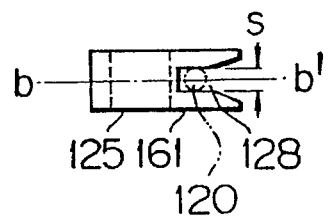
Figure 21:
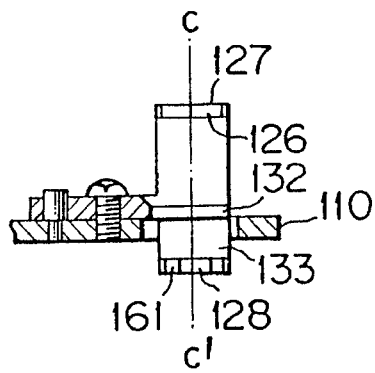
FIG. 21 is a cross-sectional view of principal parts in the prior art.
Figure 22:
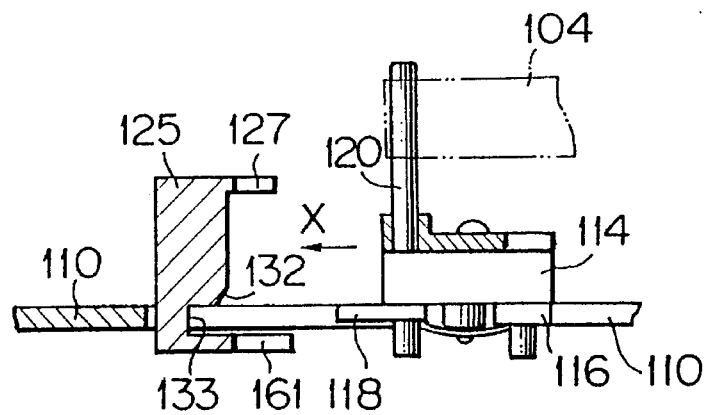
FIG. 22 is a cross-sectional view of principal parts in the prior art.
Figure 23A:
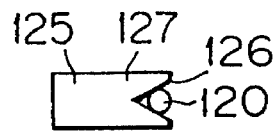
FIG. 23A is a cross-sectional view of principal parts in the prior art, showing a state that a magnetic tape withdrawer unit is abutted against a stopper, jointly with FIGS. 23B and 23C.
Figure 23B:
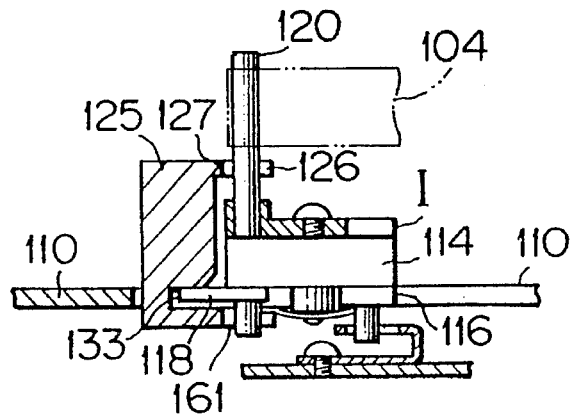
FIG. 23B is a cross-sectional view of principal parts in the prior art, showing a state that the magnetic tape withdrawer unit is abutted against the stopper, jointly with FIGS. 23A and 23C.
Figure 23C:
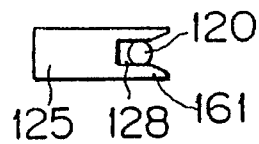
FIG. 23C is a cross-sectional view of principal parts in the prior art, showing a state that the magnetic tape withdrawer unit is abutted against the stopper, jointly with FIGS. 23A and 23B.
Figure 24:
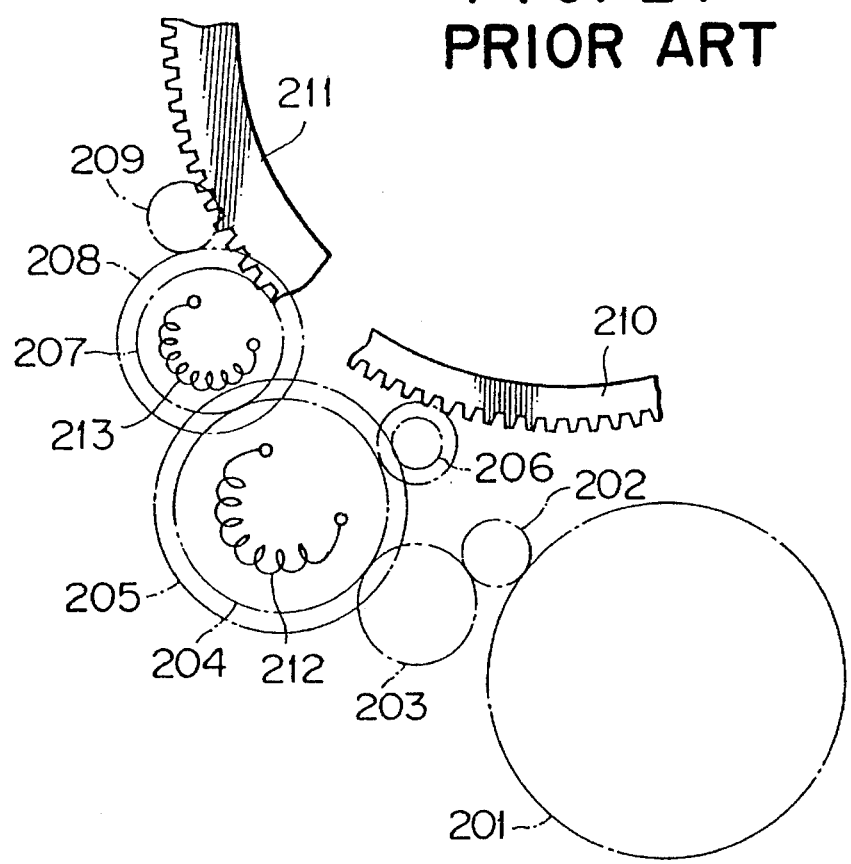
FIG. 24 is a schematic plan view showing an arrangement of a loading post driving device in the prior art.
Figure 25:
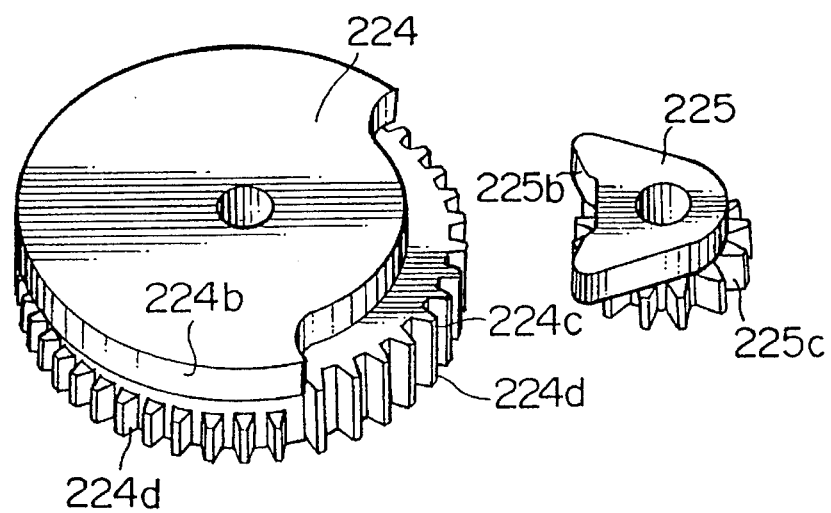
FIG. 25 is a schematic plan view showing an arrangement of an intermittent motion mechanism as a drive part for a loading device in the prior art.
Figure 26A:
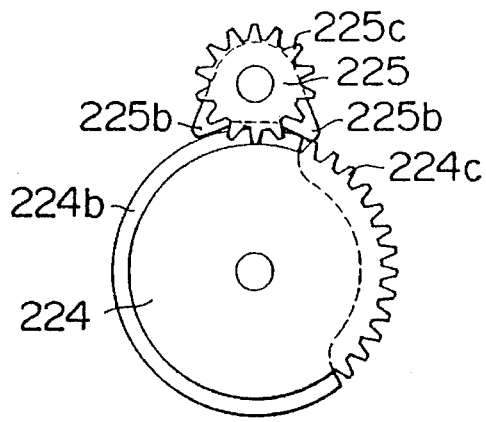
FIG. 26A is a plan view of principal parts of illustrating an operation of the loading device in the prior art jointly with FIGS. 26B to 26F.
Figure 26B:
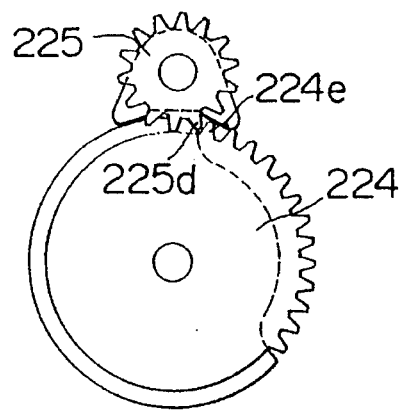
FIG. 26B is a plan view of principal parts of illustrating an operation of the loading device in the prior art jointly with FIGS. 26A and 26C to 26F.
Figure 26C:
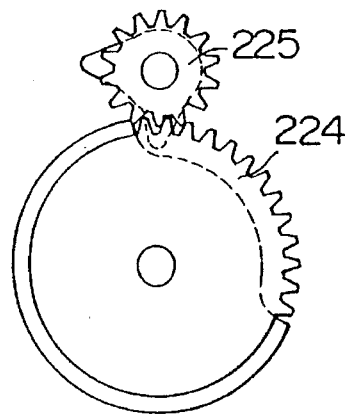
FIG. 26C is a plan view of principal parts of illustrating an operation of the loading device in the prior art jointly with FIGS. 26A, 26B and 26D to 26F.
Figure 26D:
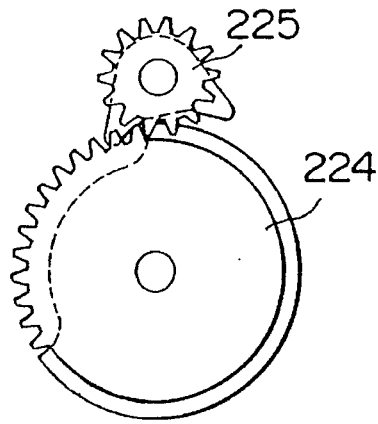
FIG. 26D is a plan view of principal parts of illustrating an operation of the loading device in the prior art jointly with FIGS. 26A to 26C, 26E and 26F.
Figure 26E:
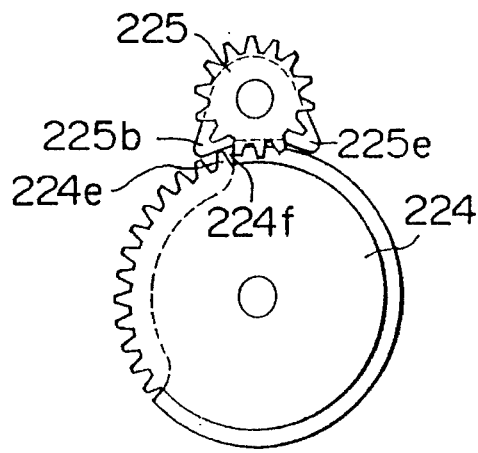
FIG. 26E is a plan view of principal parts of illustrating an operation of the loading device in the prior art jointly with FIGS. 26A to 26D and 26F.
Figure 26F:
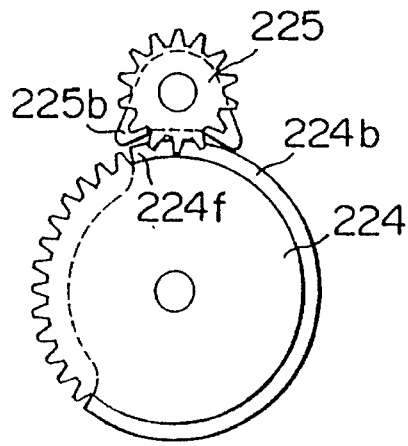
FIG. 26F is a plan view of principal parts of illustrating an operation of the loading device in the prior art jointly with FIGS. 26A to 26E.

Next, the arrangement for positively realizing higher-precision of the positioning mechanism is this embodiment will be explained with reference to the drawings. FIGS. 17A and 17B are side views partly cross-sectioned, for explaining a phenomenon which is expected to occur during an operation of positioning the take-up side boat 5 in this embodiment. Denoted by 1a is a reference surface on the chassis 1 and 15b is a reference surface on the take-up side boat 15. Further, 15c is an insertion hole having a substantially cylindrical shape into which the take-up side drive shaft 55 is inserted.

In the drawings, as the take-up side drive shaft 55 moves, the take-up side boat 15 comes into the loading terminal position (from FIGS. 17A to 17B). At the loading terminal position, the driving force in the direction P is always applied to the take-up side boat 15 through the take-up side drive shaft 55 under an action of the swing plate 45 (described above). This causes the V-shape 15a to abut against the stopper 87 for positioning the take-up side boat 115.

As will be apparent from the drawings, the take-up side boat 15 is inclined relative to the take-up side drive shaft 55 and, therefore, the take-up side drive shaft 55 applies the driving force in the direction P (FIG. 17A) to the bottom end portion of the insertion hole 15c (at a position above the abutting point between the stopper 87 and the V-shaped groove 15a), thereby producing force tending to turn the entire take-up side boat 15 in a direction of an arrow O (FIG. 17B) about the abutting point between the stopper 87 and the V-shape groove 15a. This can raise a problem of making the rear end portion of the take-up side boat 15 float from the reference surface.

As means for preventing such a problem, it could be supposed to provide a leaf spring or the like on the chassis 1 so as to apply biasing force in a direction of an arrow F. However, this arrangement cannot be optimum because of increasing the space occupied and the number of assembling steps, which impedes simplification of the device structure.

In this embodiment, therefore, the take-up side boat 15 is provided with a projection 15d on the underside of the boat 15 in front of the insertion hole 15c and with an inclined region 15f at a location where the take-up side boat 15 abuts against the fixed arm 54, while an inclined region 54a is formed at one end of the fixed arm 54 on which the take-up side drive shaft 55 is provided, as shown in FIGS. 18A–19B. Note that although the insertion hole 15c is substantially cylindrical in this embodiment, the shape and depth of the hole are not limited to the illustrated ones. For instance, the insertion hole 15c may be one of which depth is equal to the boat thickness.

According to the above structure, when the take-up side drive shaft 55 is driven with rotation of the take-up side ring gear 39, the driving force in the direction P is applied to the bottom end portion of the insertion hole 15c so that the take-up side drive shaft 55 guides the take-up side boat 15 along the take-up side loading guide 18 until the loading terminal position as stated above. In succession with this, as the take-up side boat 15 comes nearer to the loading terminal position, it moves downwards relative to the take-up side drive shaft 55, causing the inclined surface 54a of the fixed arm 54 to abut against the projection 15d of the take-up side boat 15.

At this time, the inclined region 54a advances while riding over the slope of the inclined region 15f of the take-up side boat, whereby driving force imposed by the take-up side drive shaft 55 in a direction of an arrow P' (FIG. 18B) is applied to the lower portion of the projection 15d (at a position below the abutting point between the stopper 87 and the V-shape groove 15a) during positioning the take-up side boat 15. This produces force tending to turn the entire take-up side boat 15 in a direction of an arrow R about the abutting point between the stopper 87 and the V-shaped groove 15a. As a result, the reference surface 15b in the rear end portion of the take-up side boat 15 is positively brought into abutment against the reference surface 1a of the chassis 1 for enabling high-accurate positioning.

Thus, with this embodiment, the driving force imposed by the take-up side drive shaft 55 in the direction P can be shifted in its acting point from the bottom end portion of the insertion hole 15c to the lower portion of the projection 15d in course of the positioning operation, thereby producing force tending to press the entire take-up side boat 15 against the chassis 1 for achievement of the reliable positioning.

Figure 12:
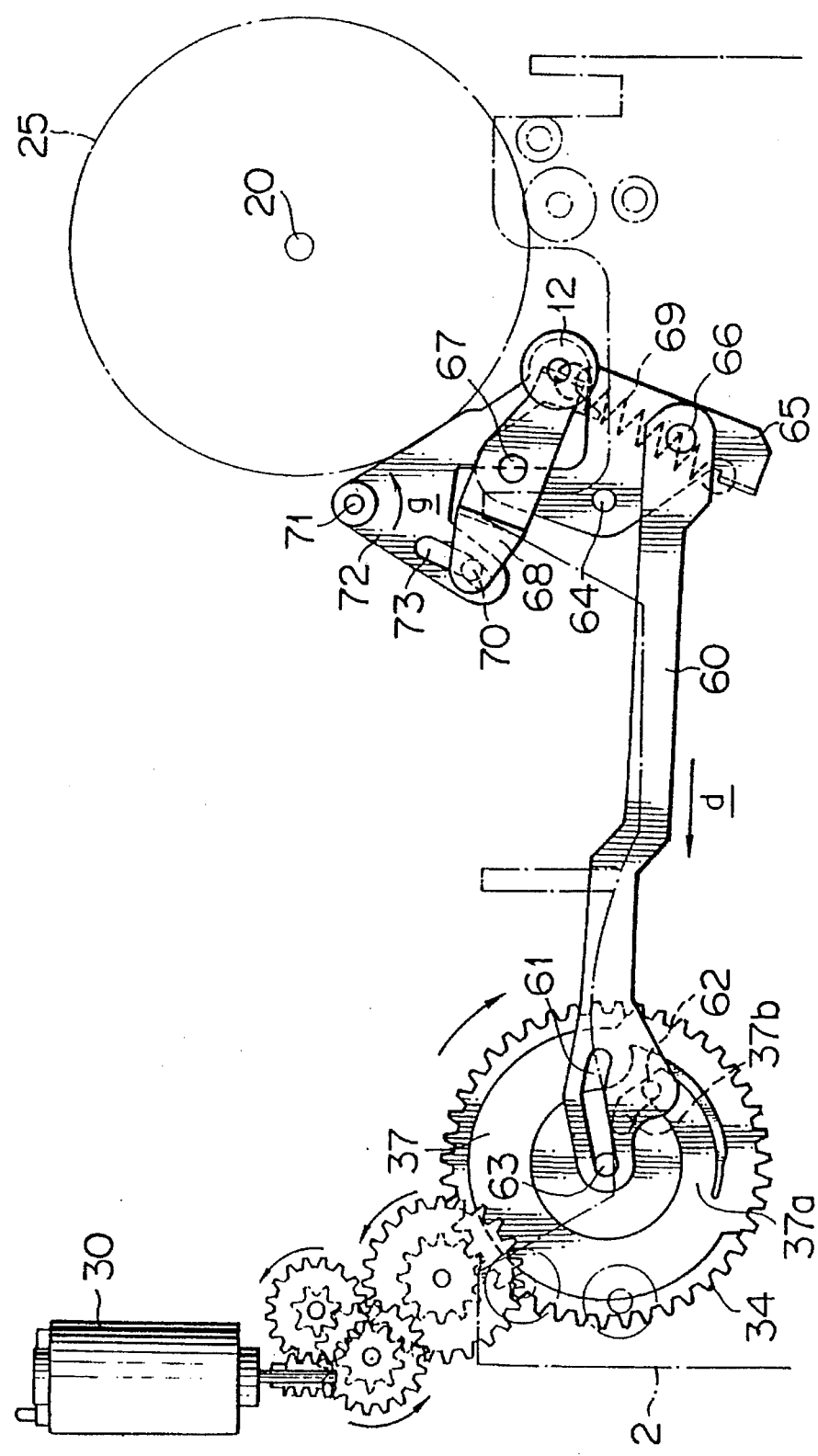
FIG. 12 is a top plan view of illustrating a pressing operation of a pinch roller in the embodiment of FIG. 1.
Figure 13:
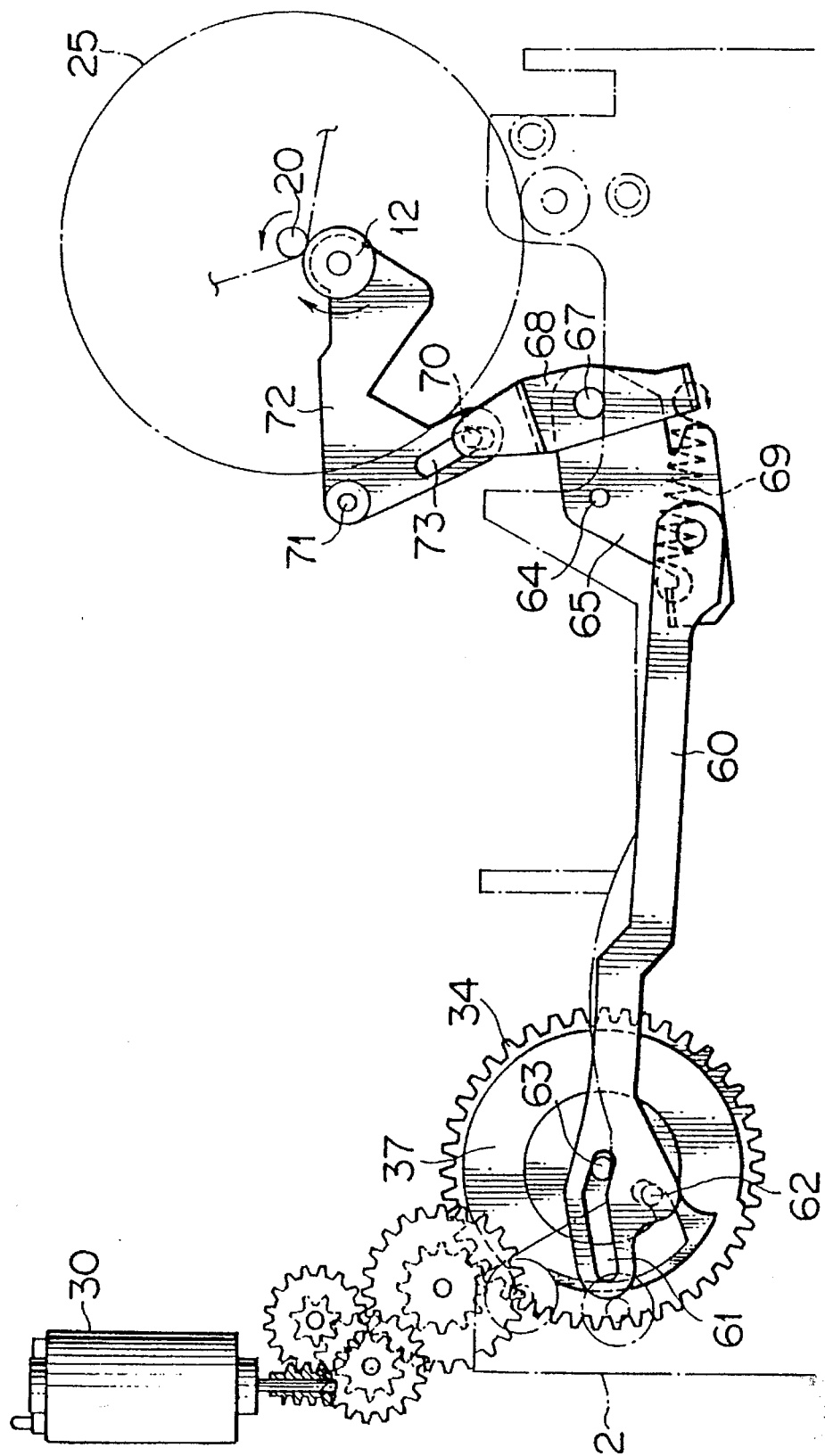
FIG. 13 is a top plan view of illustrating the pressing operation of the pinch roller.

The mechanism of making the pinch roller 12 press-contact with the capstan 20 through the cam portion 37 of the cam gear 34 will now be described. In FIGS. 12 and 13, the cam portion 37 of the cam gear 34 comprises a cam groove 37a extending in the circumferential direction and a bent cam groove 37b bent toward the center so as to press the pinch roller 12 against the capstan 20 after the tape loading operation. Denoted by 60 is a pinch rod which moves in interlock with the cam portion 37 of the cam gear 34, and has at one end an elongated hole 61 extending in a direction of length of the pinch rod 60 and a cam follower 62 engaging with the cam grooves 37a and 37b formed in the cam portion 37. A shaft 63 of the cam gear 34 is fitted in the elongated hole 61. The other end of the pinch rod 60 is connected through a pin 66 with one end of a first pin charge arm 65 pivotally supported by a shaft 64 mounted upright on the chassis 1. The first pinch charge arm 65 has the other end to which a second pinch charge arm 68 is pivotally supported at its middle portion through a pin 67. A spring 69 is interposed between the one end of the first pinch charge arm 65 and one end of the second pinch charge arm 68. A pin 70 provided at the other end of the second pinch charge arm 68 is fitted into an elongated hole 73 at one end of a pinch arm 72 rotatably attached to the chassis 1 through a pin 71, and the pinch roller 12 is attached to the other end of the pinch arm 72 at the same inclination as the capstan 20.

Figure 14A:
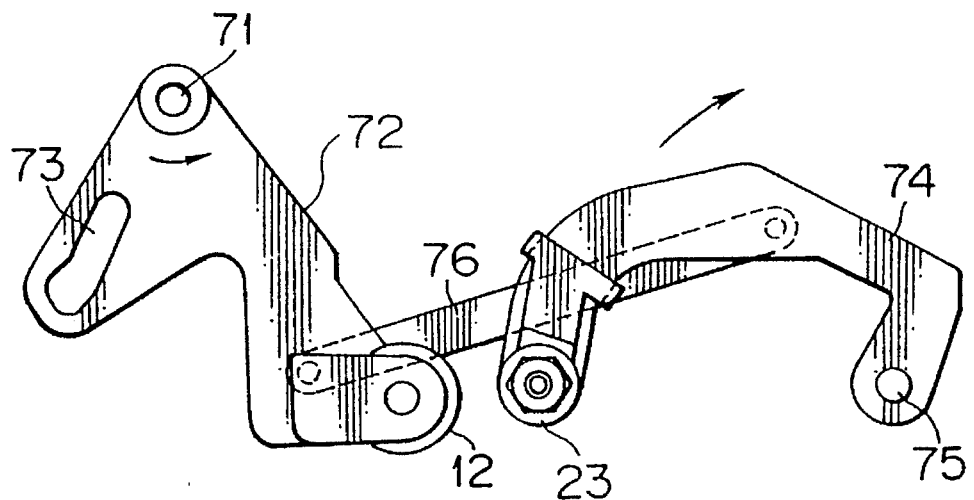
FIG. 14A is a top plan view of illustrating the pressing operation of the pinch roller jointly with FIG. 14B.
Figure 14B:
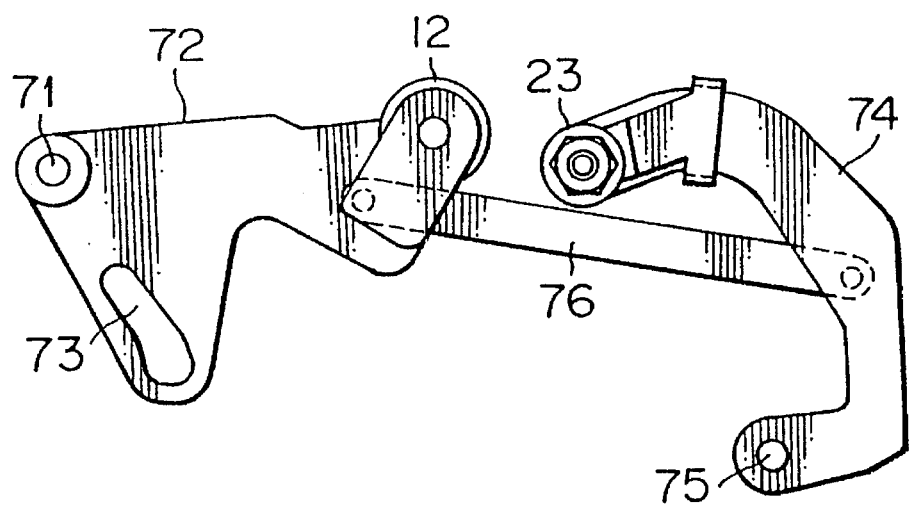
FIG. 14B is a top plan view of illustrating the pressing operation of the pinch roller jointly with FIG. 14A.

As shown in FIGS. 14A and 14B, an arm 74 has one end which is pivotally supported by a shaft 75 mounted upright on the chassis 1, and the other end provided with the auxiliary guide post 23 extending upwards therefrom at the same inclination as the capstan 20.

Further, the arm 74 is connected with the pinch arm 72 via a link 76.

Figure 10:
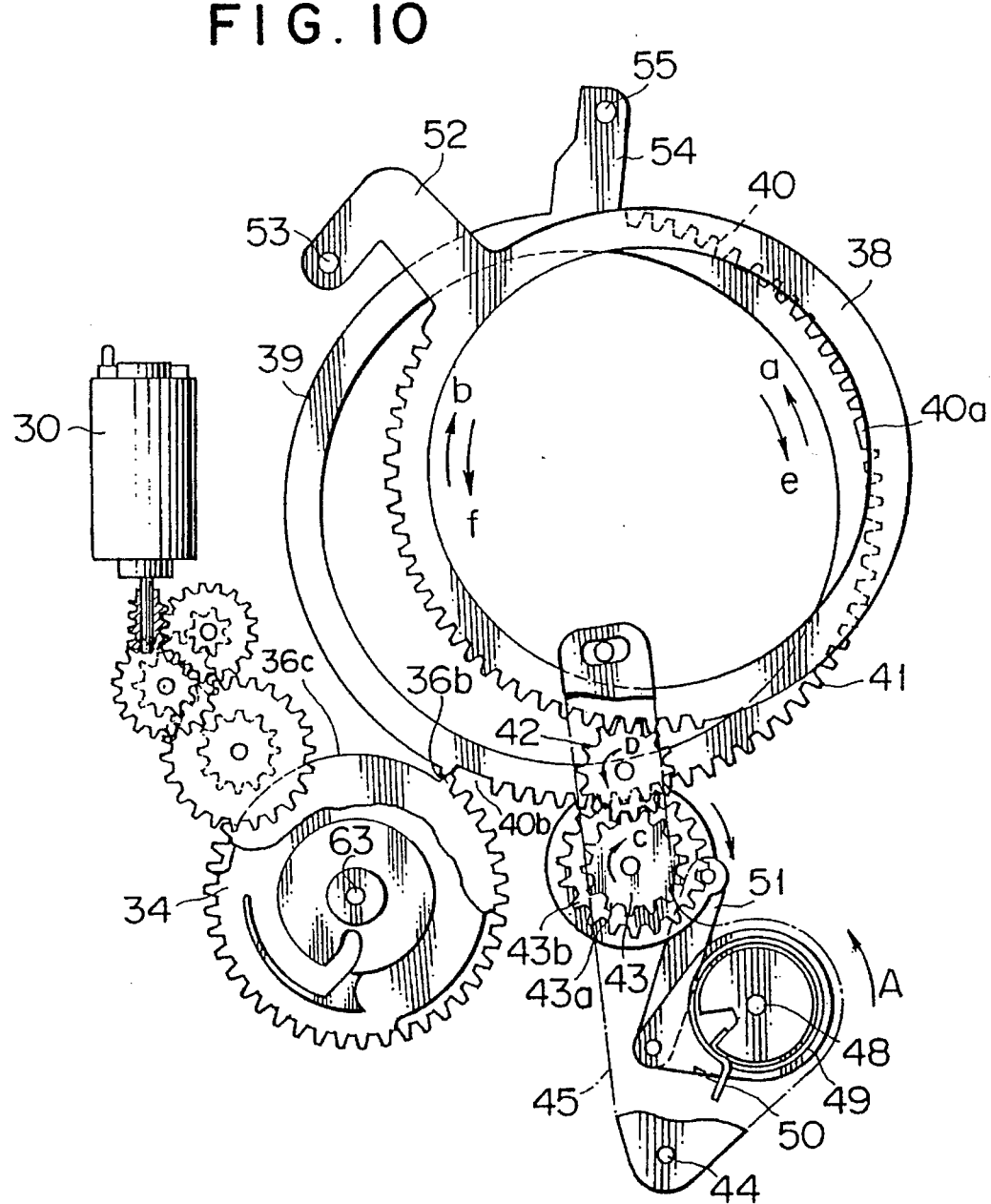
FIG. 10 is a top plan view of illustrating the operation of loading the magnetic tape.

The operation of loading the magnetic tape by means of the above-mentioned will be next described in detail. FIGS. 9A and 10 are explanatory views each showing a state of the gear train in a process of the loading operation. FIGS. 1 and 9A illustrate a state of the gear train before starting the loading operation. In this state, the supply side boat 14 and the take-up boat 15 are located at unload positions (home positions) at the beginning ends of the supply side loading guide 17 and the take-up side loading guide 18, respectively. As shown in FIG. 3, the tension post 9, the supply side loading roller post 8 and the inclined post 16 are relatively inserted in the recessed portion 5 of the tape cassette 2; and the first and second take-up side loading roller posts 10 and 11 are inserted in the recessed portion 6. Additionally, the pinch rod 60 is forcedly moved in a direction of an arrow c by means of the cam follower 62, so that the pinch roller 12 is retracted at the position most remote from the capstan 20 via the first and second pinch charge arms 65, 68 and the pinch arm 72. And, in a similar manner to the pinch roller 12, the inclined guide post 23 is also retracted at the position most remote from the capstan 20 by means of the arm 74 which moves in interlock with the pinch roller 12. As a result, an shown in FIG. 3, the pinch roller 12 and the inclined guide post 23 are both inserted relatively in the recessed portion 7 of the tape cassette 2.

As soon as the loading operation is started, the cam gear 34 rotates in a clockwise direction, coming into a state of FIG. 9A. Thus, the second intermittent gear portion 36 is surely meshed with the teeth region 40 of the take-up side gear because the terminal end 36a of the second intermittent gear portion 36 is received in the first toothless region 40a of the ring gear 39.

This state of the cam gear 34 and the take-up side ring gear 39 engaging with each other is shown in FIG. 9B in enlarged scale. In FIG. 9B, if the take-up side ring gear 39 included not the toothless region 40a, but a tooth denoted by 40f, the presence of the tooth 40f would interfere with the terminal end 36a of the second intermittent gear portion 36 of the cam gear 34, whereby the cam gear 34 could not reliably engage with or disengage from the take-up side ring gear 39 during rotation of the cam gear in the direction of the arrow A or B.

Returning to FIG. 9A, the take-up side ring gear 39 rotates in the direction of the arrow a by further rotation of the second intermittent gear portion 36, while the supply side ring gear 38 rotates in the direction of the arrow b through the pendulum gear 43 and the intermediate gear 42 rotating in interlock with the take-up side ring gear 39. Accordingly, the supply side boat 14 is driven in the loading direction of means of the drive shaft 53 provided on the fixed arm 52 of the supply side ring gear 38. At this time, the drive shaft 53 arcuately moves by means of the supply side ring gear 38, while the holder portion 57 of the supply side boat 14 moves linearly along a straight portion at the beginning and of the supply side loading guide 17. Therefore, the supply side boat 14 gradually comes nearer to the guide side as the boat 14 moves. After the holder portion 57 of the supply side boat 14 shifts to the circular portion of the supply side loading guide 17, as shown in FIG. 8, the front end portion of the supply side boat 14 moves along the outer periphery of the supply side loading guide 17. Following that, the supply side boat 14 is moved stably because it is supported by the drive shaft 53 and the holder portion 57, whereby the magnetic tape 13 is withdrawn out of the tape cassette 2 and wound around the rotary head cylinder 19 uniformly and surely by the supply side loading roller part 8. Note that the take-up side boat 15 is also moved in a manner similar to the supply side boat 14 and thus the description thereof will not be repeated.

In succession with this, just before completing the loading operation when the supply side and take-up side boats 14 and 15 come into abutment against the respective stoppers 86 and 87 shown in FIG. 5, the second intermittent gear portion 36 of the cam gear 34 is not meshed with the teeth region 40 of the take-up side ring gear 39 because the terminal end 36b of the second intermittent gear portion 36 is disengaged from the second toothless region 40b of the ring gear 39, as illustrated in FIG. 10.

The description as set forth above in connection with the first toothless region 40a by referring to FIG. 9B similarly applies to the role of the second toothless region 40b.

In this state, the charge arm 49 being urged to turn in the direction of the arrow A tends to rotate the pendulum gear 43 in a direction of an arrow C through the link 51. This urging torque forces the take-up side ring gear 39 to rotate in the direction of the arrow a so that the take-up side boat 15 is pressed against the stopper 87 through the take-up side drive shaft 55 for precise positioning. Simultaneously, the urging torque imposed on the pendulum gear 43 in the direction of the arrow C tends to rotate the intermediate gear 42 in a direction of an arrow D, whereby the supply side ring gear 38 is forced to rotate in the direction of the arrow b so that the supply side boat 14 is pressed against the stopper 86 through the supply side drive shaft 53 for precise positioning.

The loading operation of completed in this way. Even when the timing of pressing the supply side boat 14 against the stopper 86 is somewhat deviated from the timing of pressing the take-up side boat 15 against the stopper 87, an adjustment is made by the swing plate 45 slightly swinging in any direction around the shaft 44 so that the supply side boat 14 and the take-up side boat 15 are positively pressed against the stoppers 86 and 87, respectively.

When the cam gear 34 further rotates in the clockwise direction after completing the loading operation, as shown in FIGS. 2, 12 and 13, the cam follower 62 provided on the pinch rod 60 is forced to enter the bent cam groove 37*b* of the cam portion 37 so as to pull the pinch rod 60 in a direction of an arrow d. As a result, the first pinch charge arm 65 is rotated in the clockwise direction about the shaft 64 to push the second pinch charge arm 68 in a direction of an arrow g. Then, the pinch arm 72 is turned through the pin 70 in an anti-clockwise direction about the pin 71 virtue of resilient force of the tension coil spring 69 in order to press-contact the pinch roller 12 with the capstan 20.

Simultaneously, as shown in FIG. 14, the link 76 is pushed for turning the arm 74 in the clockwise direction about the shaft 75 for locating the auxiliary guide post 23, provided at the one end of the arm 74, to be interposed between the capstan 20 and the inclined post 24. Thereby, a gently sloped path of the magnetic tape 13 extending from the take-up side loading roller post 11 to the capstan 20 is favorably maintained.

During an operation of unloading the magnetic tape, the cam gear 34 rotates in the anti-clockwise direction in FIG. 10 to release the press-contacting movement of the pinch roller 12. Then, the second intermittent gear portion 36 of the cam gear 34 is positively meshed with the teeth region 40 of the take-up side ring gear 39 because the terminal end 36*b* of the second intermittent gear portion 36 is received in the second toothless region 40*b* of the ring gear 39. Accordingly, the take-up side ring gear 39 is rotated in a direction of an arrow a which denotes the rotating direction in the unloading operation, while the supply aide ring gear 38 is rotated through the pendulum gear 43 and the intermediate gear 42 in a direction of an arrow f which denotes the rotating direction in the unloading operation. At the time illustrated in FIG. 9A when the supply side loading roller post 8 and the take-up side loading roller post 10 and 11 are relatively received in the recessed portions 5 and 6 of the tape cassette 2, respectively, the second intermittent gear portion 36 of the cam gear 34 becomes able to release from the teeth region 40 of the take-up side ring gear 39 because the terminal end 36*a* of the second intermittent gear portion 36 is positioned in the first toothless region 40*a* of the ring gear 39.

At this time, as shown in FIG. 9A, the charge arm 49 is being urged to turn in the direction of the arrow A by the torsion coil spring 50, thus tending to rotate the pendulum gear 43 in the direction of the arrow B through the link 51.

Accordingly, the take-up side ring gear 39 is forcedly rotated in the direction of the arrow e to be pressed against a stopper 91, fixedly mounted upright on the chassis 1, for precise positioning. Simultaneously, the rotating force of the pendulum gear 43 in the direction of the arrow C urges the intermediate gear 42 to rotate in a direction of an arrow E (FIG. 9A), whereby the supply side ring gear 38 is forcedly rotated to be pressed against a stopper 92, fixedly mounted upright on the chassis 1, for precise positioning.

Thereafter, when the cam gear 34 further rotates in the anti-clockwise direction through about 30° C. from the state of FIG. 9A, the tape cassette 2 is ejected (by means of a non-shown arrangement). It is needless to say that during the above process, the supply side ring gear 38 and the take-up side ring gear 39 are both not rotated from the state of FIG. 9A to maintain their press-positioned states against the stoppers 91 and 92, respectively.

According to the present invention, as will be apparent from the foregoing description, it is possible to position a loading boat with the quite simple structure and high precision, realize a stable tape running system, and reduce the size, weight and thickness of a loading mechanism to a considerable degree.

Further, according to the present invention, a pendulum gear and an intermediate gear in turn serially meshed with a take-up side ring gear serving as one loading gear, a supply side ring gear serving as the other loading gear is meshed with the intermediate gear, and further a swing plate having the pendulum gear and the intermediate gear both pivotally mounted thereon functions to absorb a deviation between the timing of pressing a loading post at the supply side and the timing of pressing a loading post at the take-up side. Therefore, at each of positions where an operation of loading a magnetic tape is completed and started, both the supply side loading post and the take-up side loading post can be surely positioned under pressing by only one urging means. Thus, it becomes unnecessary to use a pair of two-stages gears fitted with springs unlike the prior art, with very valuable advantages of enabling the loading posts to be positively driven and press-positioned with a simple gear mechanism, and reducing the size, weight, thickness and number of parts used.

Moreover, according to the invention, the take-up side ring gear serving as the one loading gear includes a toothless region, a cam gear having an intermittent gear portion capable of engaging with or disengaging from the take-up side ring gear through the toothless region is driven by a motor to rotate forward and backward, and the take-up side ring gear is forced to rotate in a direction of loading the magnetic tape at the loading terminal position and rotate in a direction of unloading the magnetic tape at the unloading position. Therefore, the cam gear can be rotated during any state of other operations such as recording/playback, fast forward drive, stop, rewind and eject of a cassette than the loading operation, while maintaining the take-up side ring gear and the supply side ring gear in their press-positioned states, thereby the so-called intermittent motion mechanism. In addition, the cam gear has the two-layered structure which enables reduction of the size, weight and thickness, and no need of a geneva gear which has been used in the prior art greatly contributes to reducing the number of parts used.

What is claimed is:

1. A loading post driving device comprising:

a loading gear which is for driving a loading post to perform an operation of loading a tape and which has a toothless region;

a drive gear having an intermittent gear portion for engaging with and disengaging from said loading gear through said toothless region in order to drive said loading gear when engaged therewith;

biasing means for urging said loading gear to rotate in a direction so as to drive said loading post from an unloading position toward a loading terminal position, wherein a position of said loading post immediately after charging of a tape cassette is said unloading position and wherein a position where said loading post has fully drawn out a tape to perform a recording/reproducing operation on the tape is said loading terminal position;

a second loading gear which is for driving a second loading post to perform said operation of loading said tape;

a pendulum gear engaged with one of said loading gear and said second loading gear;

an intermediate gear, interposed between said pendulum gear and one of said loading gear and said second loading gear with which said pendulum gear is not engaged, for making rotational directions of said loading gear and said second loading gear opposite to each other; and a swing plate on which said pendulum gear and said intermediate gear are mounted, said swing plate making said pendulum gear capable of moving within a predetermined range substantially along a circumferential direction of said one of said loading gear and said second loading gear with which said pendulum gear is engaged and making said intermediate gear capable of moving within a predetermined range substantially along a circumferential direction of said one of said loading gear and said second loading gear with which said pendulum gear is not engaged;

said biasing means urging one of said pendulum gear and said intermediate gear, to urge said loading gear and said second loading gear to rotate by said biasing means through said pendulum gear and said intermediate gear so that said loading post and said second loading post are positioned under pressure in said operation of loading said tape;

first shafts which pivotally support said pendulum gear and said intermediate gear on said swing plate;

a chassis; and a second shaft fixed to said chassis, said swing plate being pivotally supported by said second shaft to swing relative to said chassis, whereby said first shafts move relative to said chassis when said swing plate pivots relative to said chassis;

wherein said toothless region is positioned in said loading gear so that said loading gear is capable of engagement with or disengagement from the intermittent gear portion of said drive gear at said loading terminal position, and wherein when said drive gear disengages from said loading gear and subsequently said loading gear is biased to rotate further by said biasing means in said direction of driving said loading post from said unloading position toward said loading terminal position, there is no transmission of force between said drive gear and said loading gear.

2. A loading post driving device according to claim 1, further comprising means for supplying driving power to said drive gear, wherein said loading gear has a second toothless region for engaging with and disengaging from said drive gear, and wherein said drive gear has a second intermittent gear position for engaging with and disengaging from said means for supplying driving power.

3. A loading post driving device according to claim 1, wherein said biasing means further comprises means for urging, prior to said operation of loading said tape, said loading post from said loading terminal position to said unloading position.

4. A loading post driving device comprising:

a loading gear which is for driving a loading post to perform an operation of loading a tape and which has a toothless region;

a drive gear having an intermittent gear portion for engaging with and disengaging from said loading gear through said toothless region in order to drive said loading gear when engaged therewith; and biasing means for urging said loading gear to rotate in a direction so as to drive said loading post from an unloading position toward a loading terminal position, wherein a position of said loading post immediately after charging of a tape cassette is said unloading position and wherein a position where said loading post has fully drawn out a tape to perform a recording/reproducing operation on the tape is said loading terminal position;

wherein said toothless region is positioned in said loading gear so that said loading gear is capable of engagement with or disengagement from the intermittent gear portion of said drive gear at said loading terminal position, and wherein when said drive gear disengages from said loading gear and subsequently said loading gear is biased to rotate further by said biasing means in said direction of driving said loading post from said unloading position toward said loading terminal position, there is no transmission of force between said drive gear and said loading gear, said device further comprising a means for supplying driving power to said drive gear, wherein said loading gear has a second toothless region for engaging with and disengaging from said drive gear, and wherein said drive gear has a second intermittent gear position for engaging with and disengaging from said means for supplying driving power.

\* \* \* \* \*